United States Patent [19]
Kobayashi et al.
[11] 3,824,617
[45] July 16, 1974

[54] MAGNETIC TAPE COPYING APPARATUS

[75] Inventors: Fukashi Kobayashi, Hirakata; Mitsuaki Ono, Katano; Masahiko Yatsugake, Hirakata; Yukihiro Fukushima, Neyagawa, all of Japan

[73] Assignee: Matsushita Electric Industrial Co., Ltd., Osaka, Japan

[22] Filed: Apr. 12, 1972

[21] Appl. No.: 243,152

[30] Foreign Application Priority Data

| | | |
|---|---|---|
| Apr. 16, 1971 | Japan | 46-2460 |
| July 16, 1971 | Japan | 46-63174[U] |
| Apr. 19, 1971 | Japan | 46-25478 |
| July 16, 1971 | Japan | 46-63175[U] |
| Apr. 22, 1971 | Japan | 46-26592 |
| Aug. 7, 1971 | Japan | 46-70494[U] |
| Apr. 16, 1971 | Japan | 46-29652[U] |
| Aug. 23, 1971 | Japan | 46-76049[U] |
| June 7, 1971 | Japan | 46-48094[U] |
| June 8, 1971 | Japan | 46-48497[U] |
| July 12, 1971 | Japan | 46-61431[U] |
| July 12, 1971 | Japan | 46-61432[U] |

[52] U.S. Cl. 360/16
[51] Int. Cl. G11b 5/86
[58] Field of Search 179/100.2 E, 100.2 P; 346/74 MT

[56] References Cited

UNITED STATES PATENTS

| | | | |
|---|---|---|---|
| 3,176,278 | 3/1965 | Mayer | 346/74 MT |
| 3,364,496 | 1/1968 | Greiner et al. | 179/100.2 E |
| 3,465,105 | 9/1969 | Kumada et al. | 179/100.2 E |
| 3,472,971 | 11/1969 | Van Den Berg | 179/100.2 E |
| 3,496,304 | 2/1970 | Nelson | 179/100.2 E |
| 3,544,732 | 12/1970 | Bauer | 179/100.2 E |
| 3,632,898 | 1/1972 | Slade | 179/100.2 E |
| 3,676,612 | 7/1972 | Kobayashi et al. | 179/100.2 E |
| 3,699,267 | 10/1972 | Hoell | 179/100.2 E |
| 3,703,612 | 11/1972 | Higashida et al. | 179/100.2 E |

*Primary Examiner*—Alfred H. Eddleman
*Attorney, Agent, or Firm*—Stevens, Davis, Miller & Mosher

[57] ABSTRACT

A magnetic tape copying apparatus employing the so-called thermal transfer process wherein a slave tape heated to a temperature near the Curie point thereof and a master tape having a signal recorded thereon are put together with the magnetic surfaces thereof in contract with each other and cooled, whereby the signal on the master tape is transferred onto the slave tape, said apparatus comprising novel tape heating and compressing means which makes possible the use of a tape having a high coercive force and a high Curie point, such as $CrO_2$ tape, as the slave tape which could not be used in conventional transfer processes, and which enables quality copied tapes to be obtained at a high efficiency without causing physical damage to the slave tape.

18 Claims, 52 Drawing Figures

MAGNETIC TAPE COPYING APPARATUS

This invention relates to a magnetic tape copying apparatus.

With the use of VTR prevailing, there has been an increasing demand for apparatus capable of copying recorded video tapes in large quantities at low costs and in a short period of time for domestic and educational uses. In order to meet such demand, a magnetic tape copying apparatus applying the principle of magnetic field transfer was developed and the intended object has been achieved to some extent by a simultaneous winding process. etc. However, with the propagation of color television in recent years, it has become necessary to copy color signals. In addition, with the development of magnetic tapes having a high coercive force and a high output, such as a $CrO_2$ tape, the conventional transfer processes utilizing a magnetic field are not entirely satisfactory with respect to the quality of the copied tapes. Namely, copying of color video signals by the magnetic transfer process involves the problems that the copying efficiency is poor and that the transfer of signals onto a tape having a high coercive force and a high output, such as a $CrO_2$ tape, is theoretically difficult by reason of the coercive force relation between the slave tape and the master tape. Under the circumstances, a thermal transfer process has now been studied to solve these problems, which is fundamentally different from the conventional magnetic transfer process.

A process in which a slave tape heated near the Curie point thereof and a recorded master tape are put together with the magnetic surfaces in contact with each other and cooled, whereby the signals on said master tape are transferred onto said slave tape, is generally called a thermal transfer process, and many discussions have been made on the advantages of this process. The most remarkable advantage is that a high output copied tape can be obtained owing to the use of an appropriate tape, such as a $CrO_2$ tape, as a slave tape and to the high transfer efficiency of the thermal transfer process. Especially, the high output characteristic exhibits a remarkable effect in a high frequency signal zone and, in the case of a video tape, a high quality picture can be regenerated which cannot be obtained by the other transfer processes.

While the thermal transfer process has such advantages on one hand, it has on the other hand many problems to be solved in the actual production of a copying apparatus which are as important as the aforesaid advantages, due to the face that heat is handled. The most important one of them is thermal deformation of the slave tape.

For effecting the thermal transfer, it is necessary at least to heat the magnetic layer of the slave tape to a temperature near the Curie point. However, in the production of an ordinary slave tape using polyethylene terephthalate (PET) as the base material, the tape is cooled and hardened with a tension applied thereto in all directions. Therefore, when the tape is heated to a temperature near the Curie point in the thermal transfer process, it is deformed by the contractive stresses created by the internal stresses of the base material and acting in the longitudinal and widthwise directions of the tape. The amount of the deformation is variable depending upon the state of an external force applied to the slave tape, but since the tape is substantially free of widthwise force, the widthwise contraction by the internal force appears heavily when the tape is heated. FIG. 1 exemplifies the amount of widthwise deformation of a slave tape comprising PET as the base material when said tape was heated with a tension applied thereto in the longitudinal direction. The amount of deformation is subjected to complex influence by the magnitude of tension, heating time, cooling condition, etc. but according to the experiment shown in FIG. 1, the one-half inch slave tape contracts about 150 $\mu$ when sufficiently heated to a temperature (about 130°C) near the Curie point. On the other hand, the tape should theoretically show essentially the same deformation tendency in the longitudinal direction as that in the widthwise direction. In practice, however, the longitudinal contraction of the tape is not always so simple as will be considered and the state of contraction is variable depending upon the magnitudes of tension and contractive force, since the tape is subjected to tension during running. The relation between the temperature and elongation, using the tape tension as a parameter, is exemplified in FIG. 2. In this case, the heating time and creep characteristic also have a large influence on the amount of deformation, but in this experiment, it will be seen that, when the one-half inch slave tape is heated to a temperature near the Curie point, with a 100 gr tension applied thereto and for a period long enough for the temperature of the tape to become substantially uniform, about 0.3 percent elongation occurs. What should be noted here is not the amount of elongation near the Curie point but the amount of deformation before and after the tape is heated. It is, therefore, important to know how much of about 0.3 percent elongation remains when the tape is cooled and returned to the temperature before heating. The present inventors also conducted an experiment on this residual elongation and found that the residual elongation tends to abruptly increase and, in some instances, to more than 0.2 percent when the heating temperature becomes higher than 80°C, similar to the other characteristics.

In consideration of the lengthwise and widthwise contractions of the slave tape as discussed above, it is possible that the video track on the tape will be deformed as shown in FIG. 3 before and after the heating and deviate from the position of the track recorded on the master tape. Namely, when considering a portion of a slave tape having a length of $l_o$ and a width of $b_o$, after heating the length of this tape portion is elongated to $l$ and the width thereof is contracted to $b$. Therefore, a video track Tv which is recorded on this tape portion at an angle of $\theta_o$ to the longitudinal direction in a longitudinal length of $L_o$ and a widthwise length of $B_o$ before the tape is heated will have a longitudinal length of L and a widthwise length of B after the heat is applied. Namely, when comparing the positions of the video track before and after heating, with respect to a reference point P at one end of said track, the angle of the track on the tape changes from $\theta_o$ to $\theta$ as seen in FIG. 3. A deviation between the tracks on the master tape and slave tape, in case of a video tape, appears in the form of noise on the regenerated picture, and a large amount of deviation renders the regenerated picture extremely instable. The allowable limit of this track deviation can be calculated from the signal pattern on the video tape but the thermal deformation of the slave tape is far greater than the allowable limit. The amount of this deformation may be predicted from the basic data concerning the tape deformation but is also measured from the actual copied tape. Therefore, in a thermal copying apparatus utilizing the ordinary heating method it is impossible to control the thermal deformation of a slave tape to be within the allowable limit and hence to obtain a satisfactory regenerated image. The importance of the heating process used in the thermal copying apparatus is concluded from the foregoing background. The present inventors examined various methods of preventing or otherwise decreasing the thermal deformation of the slave tape and have employed the following process in the development of the subject copying apparatus. Namely, it is a so-called shorttime heating process in which, in heating the magnetic surface of a slave tape, the heating is effected from that side of the tape on which the magnetic surface is located and the heated magnetic surface is cooled before the heat is transferred to the surface of the base, i.e., before the entire tape is deformed, thereby stopping the effectuation of tape deformation. The response speed of deformation to the heating time is quite fast and a heating time of even as short as about several msecs is sufficient to cause the deformation of the heated portion of the tape to proceed. Therefore, by controlling the temperature distribution in the tape, the portion where the temperature is higher than 80°C which may be called the transformation point of the tape, is decreased to the smallest possible extent so that the deformation of the heated portion may be prevented by the rigidity of the other portion where the temperature is relatively low. The non-steady temperature distribution in the heated tape can be determined by thermal calculation and is as shown in FIG. 4. The temperature distribution in the slave tape, when said tape is heated such that the temperature of the magnetic layer thereof may be near the Curie point, is variable depending upon the heating time. FIG. 4 shows the temperature distribution curve when the slave tape is heated such that the temperature of the deepest portion of the magnetic layer may be near the Curie point. It will be seen that the temperature of the magnetic surface becomes extremely higher and the gradient of the distribution curve becomes steeper as the heating time is shorter. The short-period heating process will be described in further detail hereunder. When the heating time is longer than about 20 – 30 msecs, the temperature distribution in the tape is as represented by the curve (3) and the temperature of the tape rises while the tape is being heated substantially uniformly. Therefore, the thermal deformation occurs exactly as described above and the amount of deformation well exceeds the allowable limit. On the other hand, when the heating time is extremely short, the magnetic surface temperature possibly reaches several hundreds of degrees C as may be seen from the distribution curve (1) of FIG. 4 but the heat energy does not reach the base surface and the base is not substantially heated. On the other hand, the thermal deformation of the tape is attributable mainly to the tension applied to the tape during the production process and the internal stresses existing in the tape material itself, and the internal stresses generally decrease as the temperature rises. Therefore, it is conceivable that, when the magnetic layer of the tape is heated, the contractive force of the tape (in the widthwise direction) increases for a while after the temperature rises from 80°C and will reach its maximum value at a certain temperature, but will decrease thereafter. From this, it is expected that, by the short-time heating, the temperature of the magnetic surface will rise abruptly but the local contractive force will not increase so remarkably and reach a constant saturation value, and that the amount of deformation of the slave tape as a whole will be determined by the proportion of the contractive force at the saturation value or at the high temperature portion of the tape in the entire tape. In general, the proportion of the portion heated above 80°C to the entire tape becomes smaller and hence the amount of contraction in the widthwise direction of the tape decreases, as the heating time becomes shorter, and the rate of decrease is high up to several msecs of the heating time but tends to become lower as the heating time becomes shorter. The influence of the heating time on the amount of contraction of the entire tape is variable depending upon the state of tension applied to the tape during the production process, the thermal characteristics of the base material, etc.

The present invention has manifested a practical construction which is effective for materializing the short-time heating of the slave tape.

The primary feature of the present invention lies in the adequate and effective utilization of compressed air. In the thermal copying apparatus of the instant invention, compressed air is utilized, not only for bringing the magnetic surfaces of a master tape and a slave tape into pressure contact with each other, but also for drastically changing the travelling path of the tapes near the transfer point with respect to the conventional apparatus, while maintaining the smooth travel of the tapes, thereby making it possible to position a heat source for heating the slave tape at a location in the close proximity of the transfer point. It is also an important feature of the subject apparatus that the heat source is so constructed as to have a high energy density and is positioned in the close proximity of the transfer point, so that the short-time heating of the slave tape may become possible.

Therefore, the present invention provides a great advance in the materialization of a thermal copying apparatus which is capable of not only producing a quality copied tape with a minimum deformation but also producing copied in large quantities at low costs using magnetic tapes of high output and low Curie point, such as a $CrO_2$ tape, as the slave tape.

The thermal copying apparatus of the invention has the following practical advantages:

1. Since the magnetic layer of a slave tape can be heated to a temperature near the Curie point in a short period of time, the slave tape is subjected to a minimum thermal deformation and, in case of tapes for VTR, quality copied tapes having good interexchangeability can be obtained.
2. Since the slave tape can be heated uniformly in the widthwise direction as well as in the longitudinal direction, a local deformation of the slave tape can be avoided.
3. A heat source can be positioned in the close proximity of the transfer point and hence the thermal efficiency is high.
4. The causes of unstable travel of the tapes, such as an unevenness of tape compressing force, a positional deviation between the master and slave tapes, etc. can be substantially entirely eliminated and, therefore, a satisfactory transfer can be achieved.

5. Since a heat source of high energy density and high output is used, the short-time heating of the slave tape is subjected to substantially no influence of the copying speed and a high speed copying is possible.

The features and advantages of this invention will be apparent from the following detailed description taken in conjunction with the accompanying drawings, in which.

Figure 8:
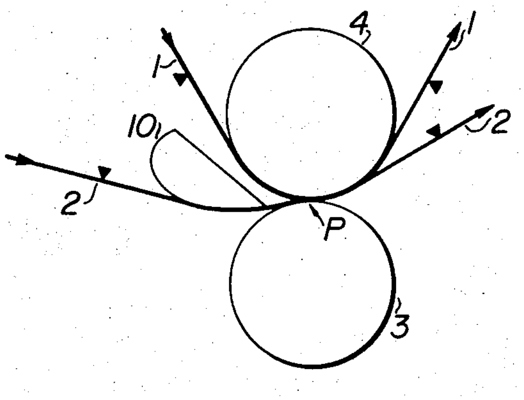
Figure 9:
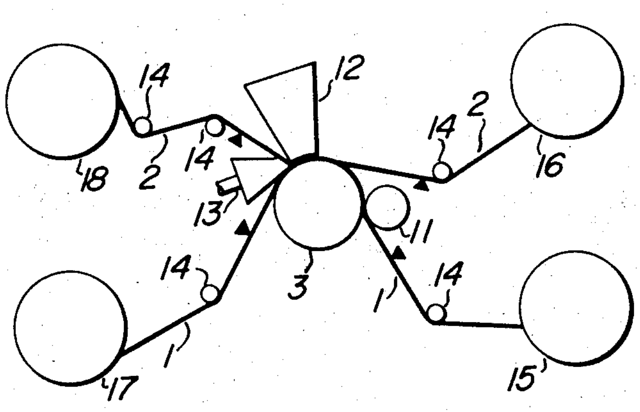
Figure 10:
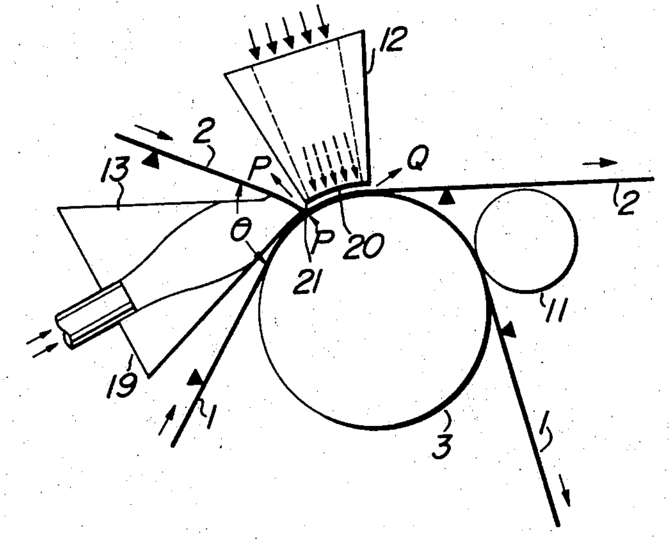
Figures 11A, 11B, 11C:
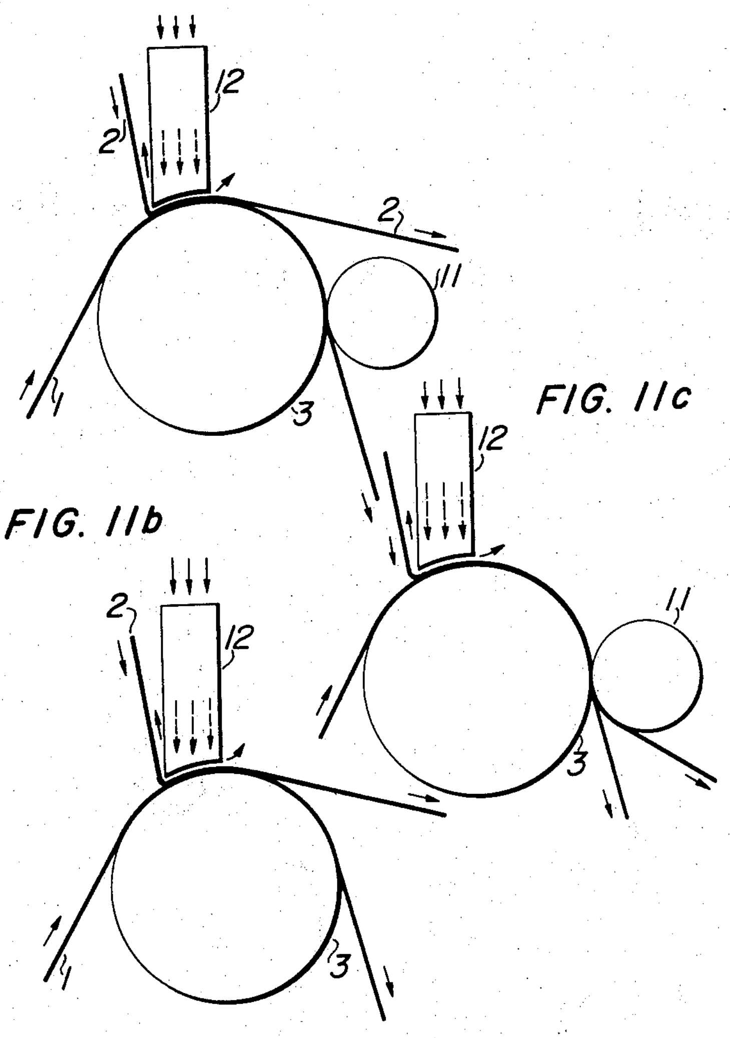
Figures 12, 13, 14:
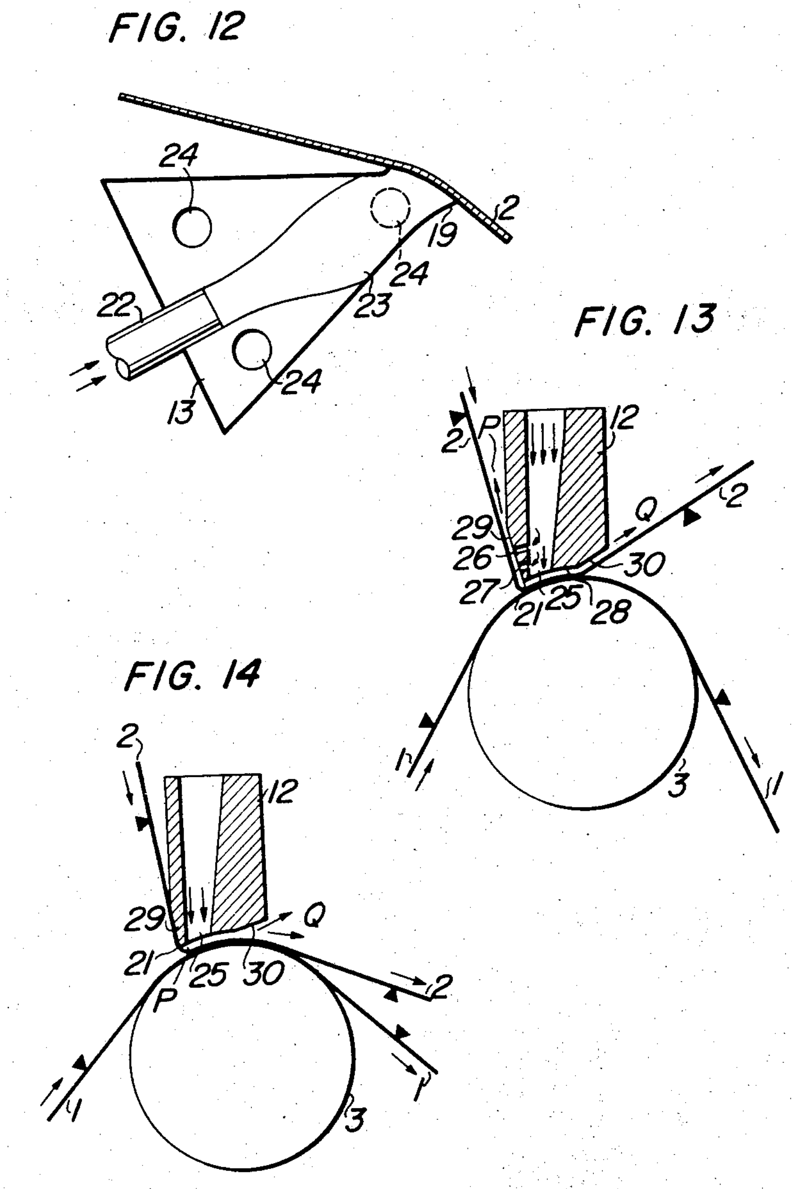
Figure 17:
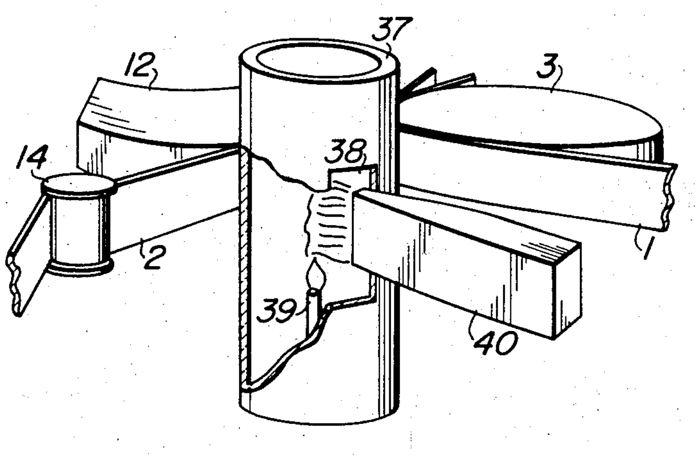
Figure 18:
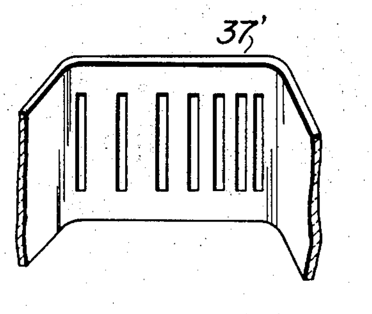
Figure 19:
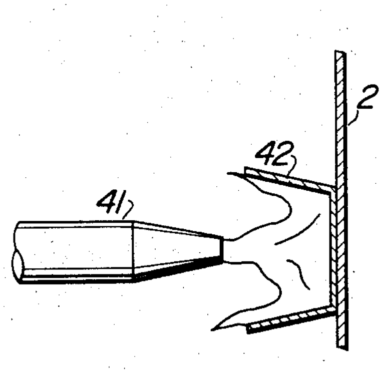
Figure 20:
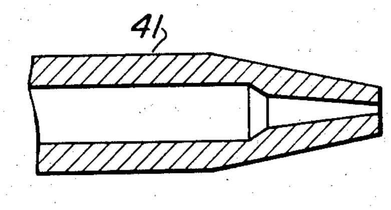
Figure 21:
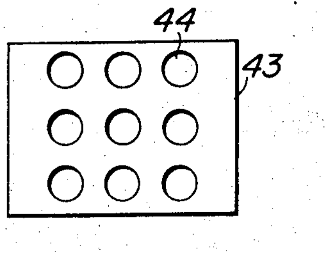
Figure 22:
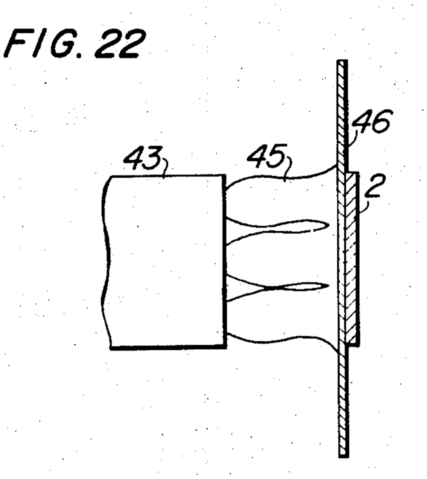
Figure 26:
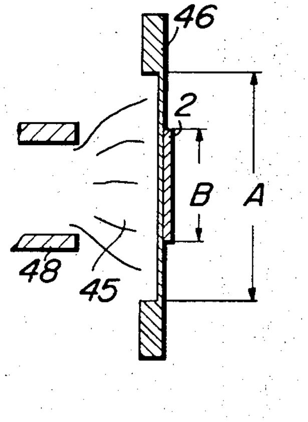
Figure 27:
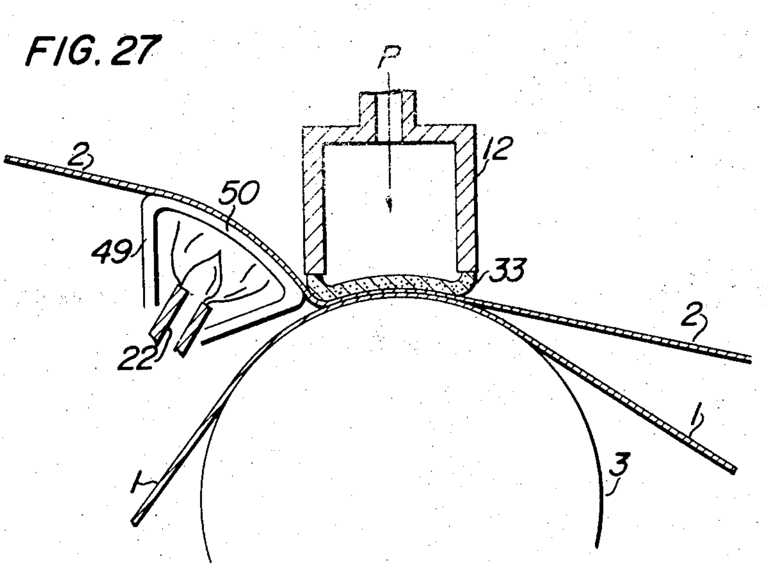
Figure 28:
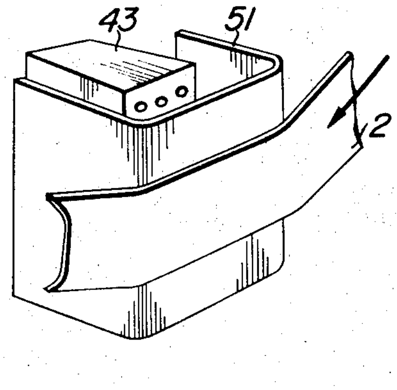
Figure 29:
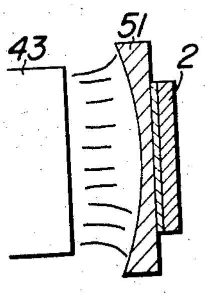
Figure 34:
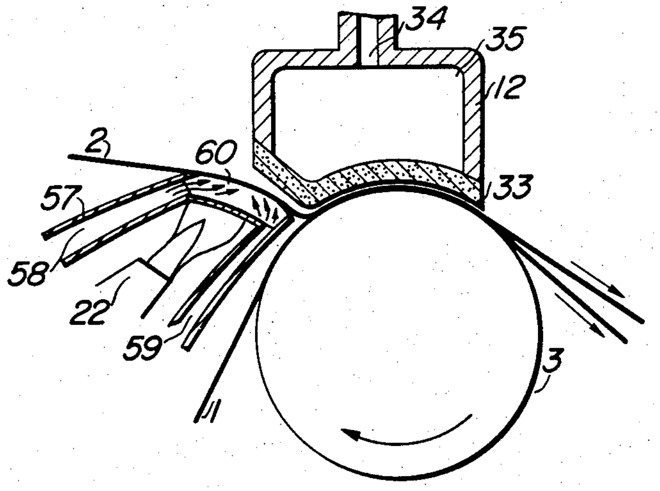
Figure 35:
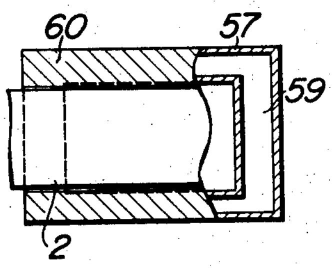
Figure 36:
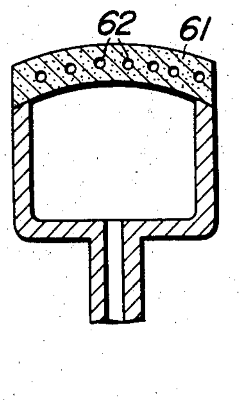
Figure 37:
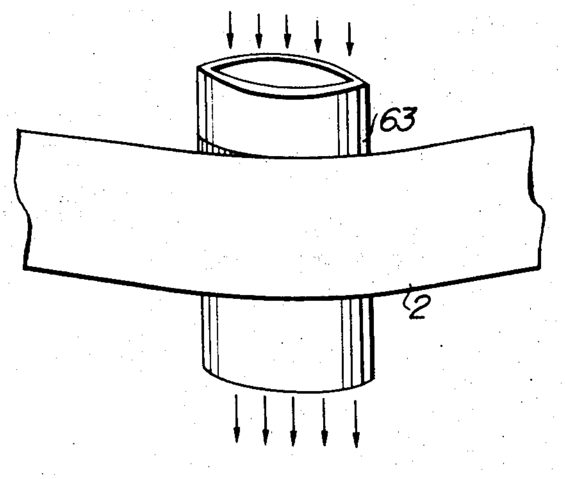
Figures 38A, 38B:
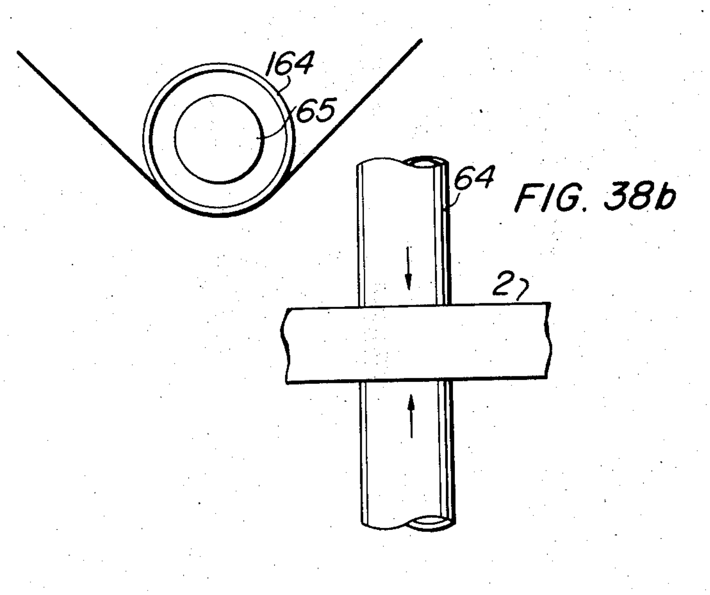
Figure 39:
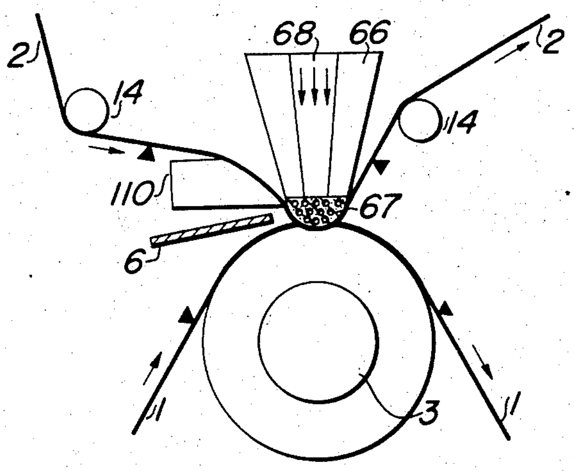
Figure 40:
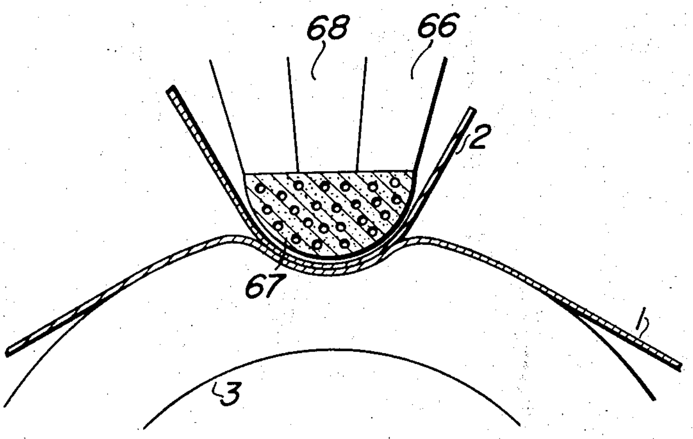
Figure 41:
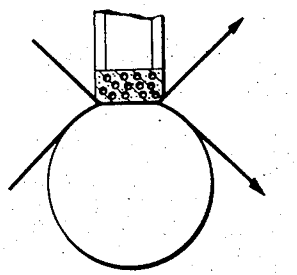
Figure 42:
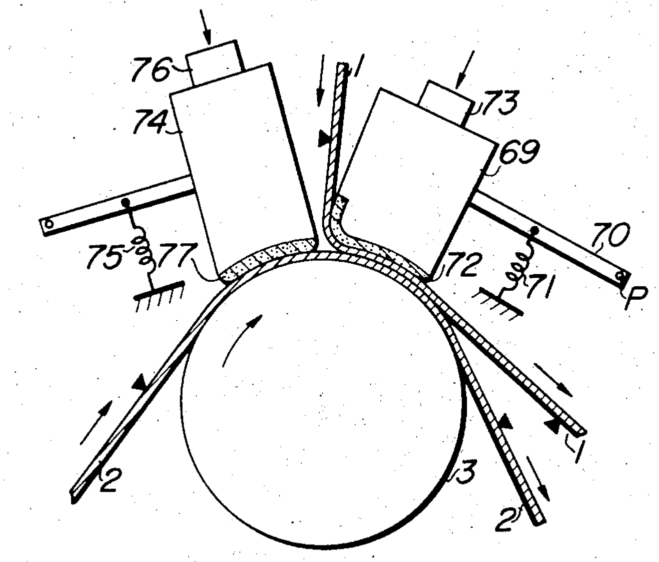
Figure 43:
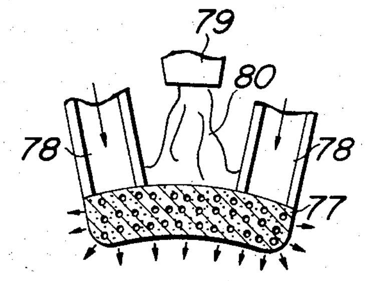
Figures 44A, 44B:
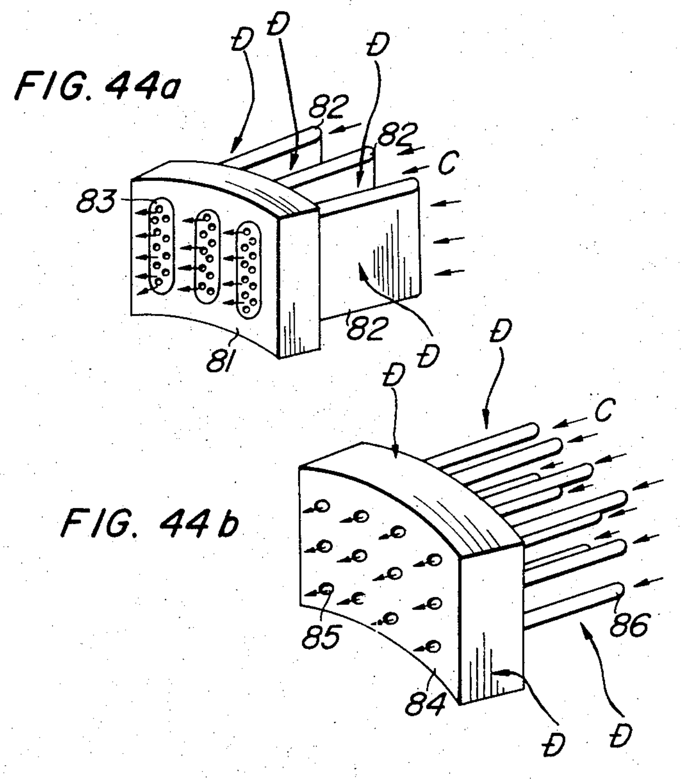

FIGS. *7a* and *7b* are diagrams illustrating a change in temperature of a slave tape during travel of said tape;

FIG. 8 is a plan view showing heating means of the conventional copying apparatus;

FIG. 9 is a plan view showing an embodiment of the present invention;

FIG. 10 is an enlarged view of the essential portion of FIG. 9;

FIGS. 11*a*, 11*b* and 11*c* are enlarged views of the essential portions of other embodiments of the invention respectively;

FIG. 12 is an enlarged sectional side view showing the essential portion of FIG. 10;

FIGS. 13, 14, 15*a*, 15*b*, 15*c* and 16 are sectional side views of the essential portions of other embodiments of the invention respectively;

FIG. 17 is a perspective view showing another form of the heating means according to the invention;

FIG. 18 is a perspective view showing one form of the heating plate;

FIGS. 19 and 20 are a side view of one form of the heating means and a sectional side view of a nozzle respectively;

FIG. 21 is a front view of a flame nozzle member;

FIG. 22 is a side view of the flame nozzle member shown in FIG. 21;

FIGS. 23, 24, 25*a* and 25*b* are front views showing other forms of the flame nozzle member respectively;

FIG. 26 is a sectional side view showing another form of the heater;

FIG. 27 is a sectional view of the essential portion of a copying apparatus using the heater shown in FIG. 26;

FIG. 28 is a perspective view showing the relative position of the heating plate and the slave tape;

FIGS. 29 – 33 are sectional side views and front views showing other modifications of the heating plate respectively;

FIG. 34 is a sectional side view showing the essential portion of still another embodiment of the copying apparatus of the invention;

FIG. 35 is a front view, partially broken away, of the heater;

FIG. 36 is a sectional view showing another form of the heater;

FIG. 37 is a perspective view showing still another form of the heater;

FIGS. 38*a* and 38*b* are a front view and a side view of still another form of the heater respectively;

FIG. 39 is a side view showing the essential portion of still another embodiment of the copying apparatus of the invention;

FIG. 40 is an enlarged view of a portion of the apparatus shown in FIG. 39;

FIG. 41 is a side view showing still another embodiment of the invention;

FIG. 42 is a side view showing still another embodiment of the invention; and FIGS. 43, 44*a* and 44*b* are perspective views showing modifications of the heating chamber respectively.

Figure 1:
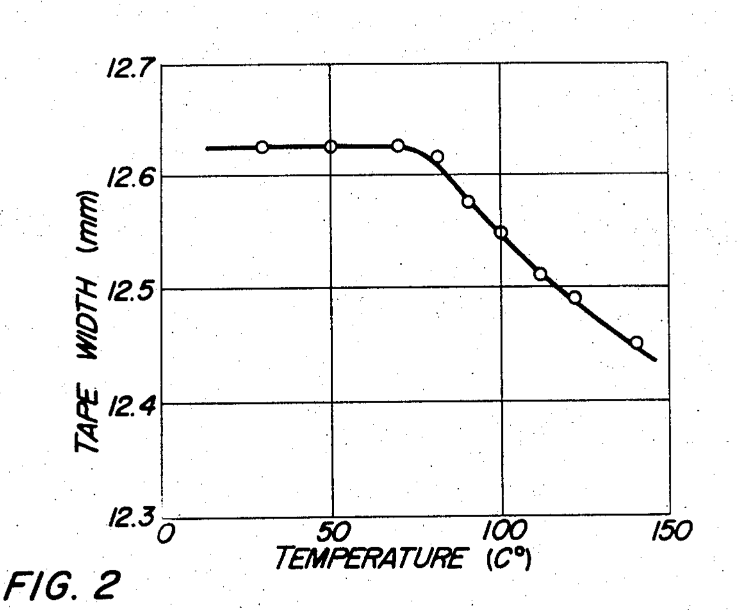
FIG. 1 is a graph showing the relationship between the slave tape heating temperature and the amount of deformation of the slave tape in the widthwise direction.
Figure 2:
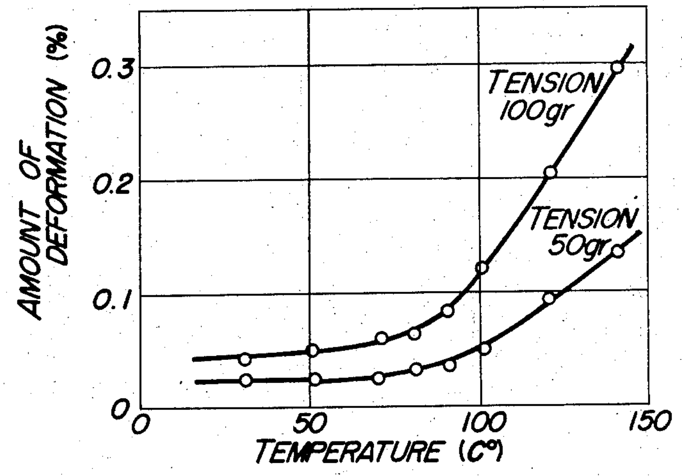
FIG. 2 is a graph showing the relationship between the slave tape heating temperature and the tape tension, and the amount of deformation of the slave tape.
Figure 3:
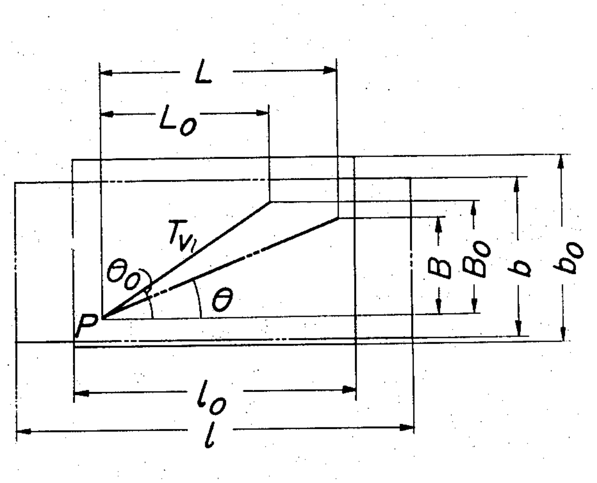
FIG. 3 is a diagram illustrating the deformation of a recorded track on a magnetic tape, incident to the deformation of said tape.
Figure 4:
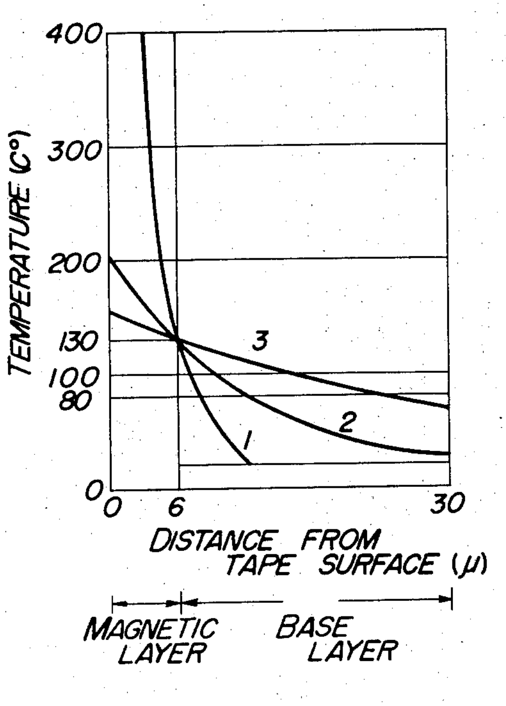
FIG. 4 is a graph showing the relationship between the slave tape heating time and the temperature distribution in the tape in the thicknesswise direction.
Figure 5:
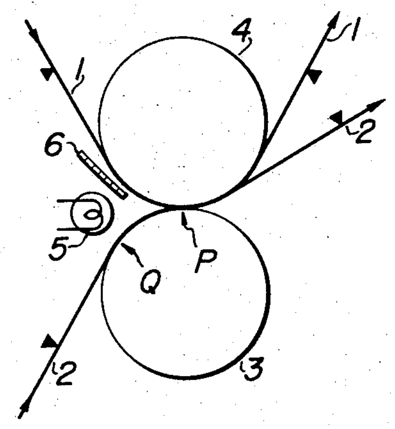
FIG. 5 PRIOR ART
FIGS. 5 and 6 are plan views showing the essential portions of conventional thermal copying apparatus.
Figure 6:
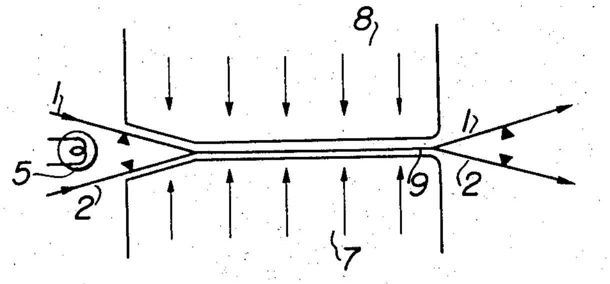
PRIOR ART FIG. 6
Figure 7A:
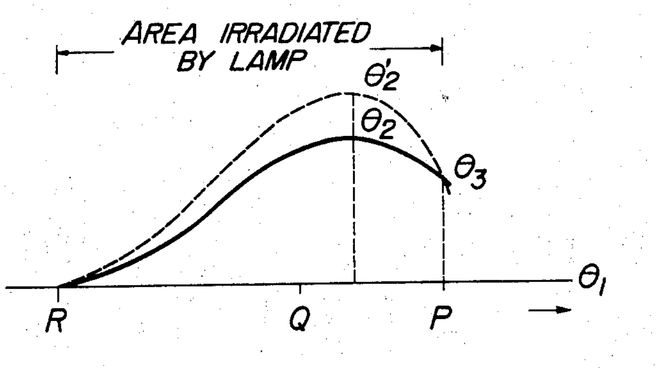
Figure 7B:
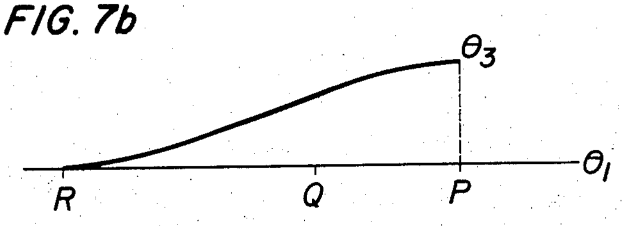

With reference to FIGS. 5 and 6, there are shown prior art apparatus. In FIGS. 5, and 6, numerals 1, 2 designate a master tape and a slave tape respectively, and the marking ▲ indicates the magnetic surfaces of the respective tapes. The master tape 1 and the slave tape 2 travel in the same plane, with their magnetic surfaces facing each other. In FIG. 5, numeral 3 designates a capstan and 4 designates a pinch roller, and both the master and slave tapes are paid out from their respective supply reels. Both tapes are driven and their magnetic surfaces are brought into pressure contact with each other, by the capstan and pinch rollers. The magnetic surface of the slave tape 2 is heated by a lamp 5 immediately before the point of contact P of the two rollers, and the temperature of the magnetic layer rises above the Curie point. The heated magnetic surface of the slave tape 2 is brought into pressure contact with the magnetic surface of the master tape 1, travelling along a different path, by the capstan roller 3 and the pinch roller 4, whereby the magnetic layer of the slave tape is cooled and the signal on the master tape is transferred onto the slave tape. Numeral 6 designates a heat intercepting plate to prevent the temperature of the master tape from rising. Such a method of bringing the magnetic surfaces of both tapes into contact with each other by means of the two rollers is disadvantageous in that the heater 5 cannot be positioned sufficiently close to the transfer point P due to the presence of the rollers 3, 4 and the distance between the point Q where the slave tape is closest to the heater 5 and the transfer point P becomes long, and in that while in the vicinity of the point Q the magnetic surface of the slave tape receives the radiant energy from the heater 5 in a direction substantially at right angles to said magnetic surface, in the vicinity of the point P the magnetic surface is substantially parallel to the direction of the radiant energy, so that the amount of energy absorbed by the magnetic surface decreases abruptly after the slave tape has passed the point Q and the magnetic surface of the slave tape cannot substantially absorb the radiant energy from the heater 5 in the vicinity of the point P. A temperature change of the magnetic layer of the slave tape in the vicinity of the transfer point is shown in FIG. *7a*. In FIG. *7a*, the axis of abscissa represents the position of the running slave tape. The slave tape starts to receive the radiant energy of the lamp from a point R and the temperature of the magnetic surface thereof gradually rises from room temperature $\theta_1$ and reaches the highest temperature $\theta_2$ at a point slightly rearwards of the point Q where the slave tape is closest to the lamp. Thereafter, a greater amount of energy dissipates from the tape surface than the amount of energy absorbed, so that the temperature of the magnetic surface gradually drops and reaches a temperature $\theta_3$ at the transfer point P. The transfer of signal from the master tape to slave tape will be effected if the temperature $\theta_3$ is higher than the Curie point of the slave tape, but the magnetic layer is heated more than required as the difference between $\theta_2$ and $\theta_3$ becomes greater, which is undesirable from the viewpoints of both the thermal deformation of the slave tape and the capacity of the heater, and makes the realization of satisfactory transfer difficult. Particularly when a method is employed in which the amount of thermal energy dissipating from the tape surface is increased by cooling the base surface of the tape, a satisfactory transfer cannot be achieved unless the temperature $\theta_2$ is elevated further to $\theta_2'$ as indicated by the dotted line in FIG. 7*a*. The elevation of the temperature $\theta_2$ and accordingly the elevation of the slave tape heating temperature will result in an increase of thermal deformation of the tape, making it impossible to obtain a satisfactory copied tape.

Another prior art apparatus will be described hereunder with reference to FIG. 6. In FIG. 6, numerals 1, 2 designate a master tape and a slave tape respectively as in FIG. 5, and numerals 7, 8 designate air chambers. Compressed air is supplied externally into the air chambers 7, 8 and discharged therefrom toward the path 9 of travel of the tapes as indicated by the arrows. Thus, it will be understood that the magnetic surfaces of the two tapes are brought into pressure contact with each other by the forces of discharged compressed air. Numeral 10 designates a lamp for heating the slave tape. This method aims to achieve the pressure contact of the magnetic surfaces of both tapes during travel of said tapes, without causing the tapes to contact the apparatus and to reduce the frictional resistance to the running tapes. Therefore, shortening the heating time is not taken into consideration which is a problem in the thermal transfer. In the thermal transfer, the state of contact between the master tape and slave tape from the time when both tapes are brought into contact to the time when they are cooled, is important and both tapes must be held against oscillation during the cooling stage. Especially in the copying of short-wave long signals such as color images in the VTR, the state of contact is required to be more strict for obtaining a good copied tape. The method shown in FIG. 6 involves problems in this sense. Namely, firstly, since compressed air is discharged concurrently from both of the air chambers 7, 8 to bring the tapes 1, 2 into pressure contact with each other, the tapes travel within the passage 9 in a floating state without contacting the confronting walls of said chambers and, therefore, the tapes tend to oscillate by being subjected to the pressure of compressed air and stable travel of the tapes is difficult to obtain. Furthermore, the discussion made on the preceding prior art apparatus with regard to the relative position of the lamp 5 and the transfer point is also applicable to this prior art apparatus. Namely, this prior art apparatus has the disadvantage that the magnetic surface of the slave tape is heated more than required at the point where said tape is closest to the lamp.

The foregoing description has been made mainly on the prior art mechanisms for bringing the master and slave tapes into pressure contact with each other but either of them is unsatisfactory in that the slave tape heating means cannot be positioned in the proximity of the compressing and cooling point and the cooling distance in the path of travel of the slave tape from the point of heating to the point of compression and transfer is so long that the heating efficiency is poor. Such prior art mechanisms are entirely unsatisfactory with respect to the concept of the short-time heating process, i.e., the concept of not applying an unnecessarily high temperature and thereby minimizing the thermal deformation of the slave tape.

Now, the heating sources used in the prior art apparatus for heating the slave tape will be described hereunder:

One of the heating sources used heretofore is a radiant heat source such as a lamp (FIG. 5). In case of the radiant heat source, as will be apparent from FIG. 5, only a very small proportion of the radiant energy is used for heating the magnetic surface of the slave tape and the major part of the energy dissipates in directions other than toward the slave tape, so that the heating efficiency is poor. In order to enhance the heating efficiency, it has been practiced to provide a reflector, but this method has the disadvantage that the effect of reflection is not so remarkable but rather the temperature in the vicinity of the heating source rises, rendering the useful life of the heating source shorter. Furthermore, a radiant heating source has the characteristic that the amount of thermal energy absorbed by a thermal energy receiving plane is largest at a point perpendicular to the direction of radiation and sharply decreases as the plane inclines from said point, but in this heating method, as will be apparent from FIG. 5, while the magnetic surface of the slave tape is substantially perpendicular to the direction of radiation of the thermal energy in the vicinity of the point Q and said portion of the tape is satisfactorily heated, the angle of inclination of the tape increases at a point closer to the transfer point P and the magnetic surface of the tape becomes substantially parallel to the direction of radiation in the vicinity of the point P and, therefore, substantially no thermal energy is absorbed by said magnetic surface. Thus, it becomes necessary to heat the magnetic layer of the slave tape to a temperature high enough to compensate for the amount of heat cooled before the tape reaches the transfer point. Namely, an excess heat is to be applied to the tape which causes a thermal deformation of the tape. In addition, with regard to the energy density of a radiant heat source, it is said that a halogen lamp, among others, is the highest in energy density. However, even with such a radiant heat source, the slave tape heating time can be shortened to about 10 msecs at most and a successful result has not been obtained in producing a good copied tape with a minimum deformation, by using a lamp or the like as a heating source. Consequently, the use of a lamp or the like is inadequate for further shortening the heating time.

On the other hand, a heating source as shown in FIG. 8 has essentially the same disadvantage as a lamp or the like. In FIG. 8, numeral 10 designates a metallic element for heating the slave tape, in which is disposed an electric heater or the like. In this case, the heater disposed in the metallic element for heating the same must be of a considerably large output, in order that the tape may be heated in a heating time of about 10 msecs. A heater of a large output becomes large in size and, therefore, the metallic element itself becomes large in size. With such a large metallic element, it is difficult to heat the magnetic surface of the slave tape, travelling in sliding contact with the outer surface of said metallic element, to a desired temperature in a short period of time. According the calculation, when the transfer is carried out at a tape speed, for example, of 1 m/sec, the magnetic surface of the slave tape must be heated at least in a heating time within 10 msecs, for obtaining a satisfactorily copied tape. Even if the slave tape can be heated in 10 msecs, it will be necessary to concentrate an output of about 150W within the area of 1.3 $cm^2$ in the case the slave tape being a one-half inch tape. An electric heater having an output of 150W is considerably large in size and it is difficult to concentrate the thermal energy within the area of about 1.3 $cm^2$. Especially when the heating is effected by the metallic element 10, the slave tape must be heated up to a point close to the point of contact of the two rollers so as to prevent the slave tape from cooling in the vicinity of the transfer point and, to this end, the end of the metallic element 10 must be tapered toward the point P as shown in FIG. 8. With such a shape, it is difficult to maintain the tapered end of the metallic element at a high temperature because a large amount of thermal energy dissipates at the tapered end and a less amount of energy from the heater is supplied to the tapered end than to the other portion. Thus, the surface temperature of the metallic element 10 becomes lower at a point closer to the transfer point, and hence it is difficult to maintain the magnetic layer of the slave tape at the highest temperature in the proximity of the transfer point. Consequently, it becomes necessary to heat the slave tape to an unnecessarily high temperature, which makes it difficult to obtain a good copied tape by heating the slave tape effectively in a short period of time. In summation, either of the conventional heat sources is unsatisfactory with respect to energy density (heat flux).

CONSTRUCTION

An embodiment of the present invention is shown in FIGS. 9 and 10.

In FIG. 9, numeral 3 designates a capstan, 11 a pinch roller, 12 an air chamber, 13 a heater for heating the magnetic surface of a slave tape, 14 guide rollers, 1 a master tape, 2 the slave tape, and 15, 16 and 17, 18 tape-up and supply reels respectively. The master and slave tapes respectively travel along the paths indicated. The details of the portion around the transfer point will be described with reference to FIG. 10. The magnetic surface of each tape is indicated by the marking ▲. The slave tape 2 is driven by the combined action of the capstan 3 and the pinch roller 11 and heated by a hollow metallic element 19 such that the temperature of the magnetic layer thereof may be at least higher than the Curie point, at a point immediately before it is brought into contact with the master tape 1, supplied along a separate path, on the outer surface of the capstan 3. Compressed air is supplied to the air chamber 12 externally and discharged toward the base surface of the master tape from a nozzle 20 as shown. A slight gap is maintained between the nozzles and the base surface of the slave tape and the air discharged dissipates through said gap outwardly as indicated by the arrows. The master tape is held out of contact with the outer wall of the air chamber 12 by an air layer formed by the flow of discharged compressed air between the base surface of said master tape and the outer wall of said air chamber, and therefore, the master tape is subjected to substantially no frictional resistance. Both tapes are pressed against the outer surface of the capstan 3 by the air pressure and move together with said capstan 3, so that the instability of the travelling tapes can be avoided which has been encountered in the prior art apparatus utilizing air pressure. A further outstanding advantage is that the slave tape 2 is bent almost at 90° at a corner 21 of the air chamber 12 by a shoulder of a small radius of curvature, at a point immediately before it is brought into contact with the master tape 1. In the prior art apparatus, the heating efficiency is poor and the short-time heating of the slave tape is extremely difficult because the angle $\theta$ is small, but according to the present invention the angle $\theta$ can be made larger than 90° as required, so that the heating efficiency in heating the magnetic layer of the slave tape can be enhanced and the amount of thermal energy absorbed by the magnetic surface can be drastically increased. From the standpoint of construction, the air chamber can be positioned in the close proximity of a heat source and a short-time heating can be easily achieved.

In FIG. 9, numeral 13 designates a slave tape heater according to the invention. The heater 13 will be described with reference to FIG. 12. Referring to FIG. 12 there is shown the heater 13, with the upper wall thereof removed to show the internal arrangement. The heater 13 includes a casing made from a heat-resistant plate 19 of good heat conductivity and has a hollow space therein. In the hollow space is disposed a gas burner 22 from which a gas-air mixture is discharged and burned to form a flame 23. The thermal energy of the flame is transmitted through the heating plate 19 to the magnetic surface of the slave tape 2. Numeral 24 designates gas exhaust openings. The heater 13 is so constructed that the flame 23 may be directed toward the inner wall of the forward end of said heater. The heater of the type described provides a heat source far stronger than the conventionally used lamp or electric heater and supplied an amount of energy sufficient to carry out the transfer and therefore, enables the transfer speed to be increased. The flame itself can be freely varied by adjusting the fuel discharge conditions such as the shape of the burner, the supply rates of gas and air, etc. Namely, the lowering of temperature at the end portion of the heater which has been the disadvantage of the conventional methods can be readily avoided by vigorously jetting the flame toward the forward end of the heating plate as shown in FIG. 12. In addition, it is possible to concentrate the thermal energy and a heater of a high energy density can be constructed which is capable of realizing a short-time heating. In the light of the fact that the temperature of the flame is highest at the tip end thereof, it is also possible to maintain the forward end of the heating plate at the highest temperature. Consequently, the cooling of the slave tape during its travel up to the transfer point subsequent to heating can be minimized and there is no necessity for heating the slave tape to an unnecessarily high temperature. Thus, the heating efficiency is high and a good copied tape with minimum deformation can be obtained.

The use of a flame inherently involves the problem of heat leakage to other than the portion desired to be heated. However, in the method according to the invention, since the flame is confined within the heater, the heat of the flame has substantially no influence on the external elements and this is advantageous in handling of the heater. The vent openings 24 shown in FIG. 12 are provided to ensure satisfactory combustion, and serve mainly as exhaust openings. It should be understood that the same effect can be obtained when the positions of the master and slave tapes are reversed in FIG. 10, and in this case, it is also desirable to position the heater 13 close to the point of contact P of both tapes.

A smoother travel of the tapes can be obtained by using porous sintered parts to constitute the corner portion 21 of the compressed air nozzle in FIG. 10. FIGS. 11*a* and 11*b* exemplify the application of the tape compressing arrangement according to the present invention. FIG. 11*a* shows a modification of the construction shown in FIG. 10, in which the angle $\theta$ defined by both tapes in the proximity of the point of contact is further increased to be an obtuse angle by changing the shape of the air chamber 12, and FIG. 11*b* shows a further modification of the construction shown in FIG. 11*a* in which the pinch roller 11 is removed and both tapes are pressed against the peripheral surface of the capstan by compressed air and driven by the contact pressure with said capstan.

It will be appreciated that the transfer can be achieved more efficiently when the capstan is cooled or the temperature of compressed air is lowered. Of course, the pinch roller 11 may be used for driving the tapes as shown in FIG. 11*c*, and in this case, the pressure of the compressed air can be decreased since it is only required to provide pressure contact of the magnetic surfaces of both tapes.

Other embodiments of the present invention will be described one after another hereunder:

FIG. 13 shows an embodiment in which the air chamber 12 is provided with auxiliary compressed air discharge nozzles 26, 27 in addition to a main discharge nozzle 25. The main discharge nozzle 25 at a portion of the surface 28 confronting the capstan 3 but the auxiliary nozzles 26, 27 are provided in a different surface, and compressed air is discharged concurrently from these three nozzles. The total sectional area of the nozzles 26, 27 is smaller than the sectional area of the nozzle 25 and accordingly the rate of discharge of compressed air through said auxiliary nozzles is considerably lower than that through the main nozzle.

The function and effect of the auxiliary discharge nozzles will be explained in comparison with the arrangement shown in FIG. 14. In the arrangement shown in FIG. 14, the air chamber is provided with the main discharge nozzle 25 only and not provided with the auxiliary discharge nozzles 26, 27, and the tapes are pressed against the outer periphery of the capstan 3 by the pressure of compressed air discharged from the main nozzle 25 and driven by virtue of the contact pressure with said capstan. Further, after passing through the gap between the air chamber 12 and the capstan 3, the slave tape 2 travels along the peripheral surface of the capstan 3 for a while in lamination with the master tape, instead of travelling along an outer surface 30 of the air chamber 12 as in FIG. 14. With such arrangement, when the tape speed is increased, the compressed air discharged from the nozzle 25 does not dissipate from both sides P, Q of the air chamber as does in case of FIG. 10, by being blocked by the slave tape travelling at a high speed, but dissipates from the side Q only as indicated by the arrows while being urged in the direction of the arrows by the travelling slave tape. As a result, the base surface of the slave tape is allowed to contact a side wall 29 of the air chamber, and then the slave tape is bent at about 90° while being in direct contact with the shoulder 21 of the air chamber and pressed against the capstan 3 in lamination with the master tape. Therefore, a frictional resistance occurs around the shoulder 21, which adversely affects the travel of tapes and possibly causes a damage to the base surface of the slave tape. This is particularly important to note when the positions of the master and slave tapes are reversed in FIG. 14, since the master tape is used continuously and repeatedly.

Another problem which will be encountered in the arrangement of FIG. 14 is that, since the compressed air flows out only from one side Q of the air chamber and scarcely from the opposite side P, the discharge rate of air must be increased for preventing the slave tape from contacting the shoulder 21 and the air passes away at a high velocity over the base surface of the slave tape in the vicinity of the outlet end, creating a reduced pressure zone at said portion.

The degree of pressure reduction becomes larger as the pressure of compressed air increases, urging the slave tape to move in the radially outward direction of the capstan 3. Thus, the slave tape is separated from the master tape and oscillates. In the arrangement shown in FIG. 13, a stable travel of tapes can be obtained, without encountering such problem. Namely, according to this arrangement, the auxiliary discharge nozzles 26, 27 are provided in the side wall 29 of the air chamber 12, so that the slave tape is held away from the side wall 29 by the air pressure discharged through said auxiliary nozzles and constantly maintained out of contact with the air chamber 12.

When the air discharged from the nozzles 26, 27 flows in the direction of Q by being dragged by the slave tape travelling at a high speed, it passes round the shoulder 21 forming an air layer between said shoulder and the slave tape, which prevents the tape from contacting the shoulder 21 and, therefore, protects the tape against damage. Further, the slave tape is caused to travel along a side wall 30 and slowly move away from said side wall. Since the slave tape defines a flexed passage for the air flowing out in the direction of Q, the pressure reduction of the compressed air can be decreased and the formation of turbulent air flow at the point Q can be prevented. Therefore, the slave tape does not oscillate.

Figure 15A:
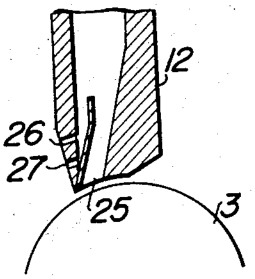
Figure 15B:
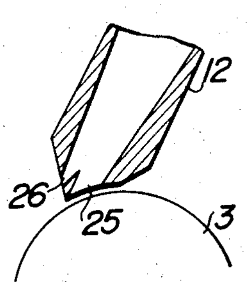
Figure 15C:
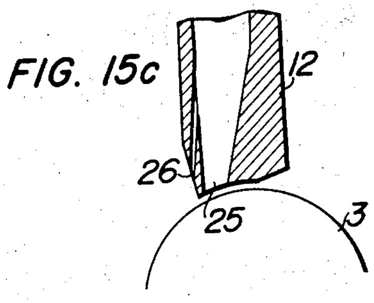

The arrangements shown in FIGS. 15*a*, 15*b* and 15*c* are all modifications of the above-described apparatus and are so designed that the compressed air may be discharged smoothly. In the arrangement of FIG. 15*a*, the interior of the air chamber is divided into two separate flow passages. In the arrangement of FIG. 15*b*, the direction of the entire air chamber is inclined so as to facilitate the discharge of compressed air through the main and auxiliary nozzles. In the arrangement of FIG.

15*c*, the shape of the auxiliary discharge nozzle is changed.

Further embodiments of the present invention applying the above-described arrangements will be described one after another hereunder:

1. Embodiment applying the arrangement of FIG. 13

Figure 16:
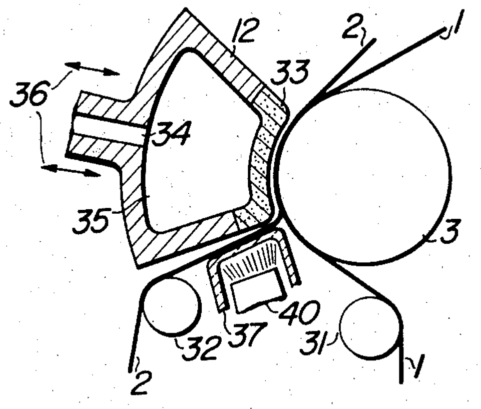

With reference to FIG. 16, numeral 1 designates a master tape, 2 a slave tape, 31 and 32 guide posts for guiding the respective tapes, 3 a tape driving rotor, and 12 a tape compressing unit. The tape compressing unit 12 has an arcuate portion 33 made of a porous sintered alloy or the like. Compressed air is introduced into the internal hollow 35 of the compressing unit 12 through a nozzle 34 and discharged from the surface of the sintered alloy 33. The slave tape is brought into pressure contact with master tape by the pressure of compressed air discharged from the surface of the sintered alloy. Both tapes are pressed against the rotor 3 also by the pressure of compressed air and driven thereby. The compressing unit 12 is shiftable in the directions of the arrows 36. During travel of the tapes, the compressing unit 12 is biased toward the rotor 3 with a force just enough to hold the tapes in pressure contact with the rotor and to maintain a slight gap between the slave tape and the compressing unit, by the pressure of air discharged through the pores in the sintered alloy. Therefore, the slave tape is held out of contact with the compressing unit while it is being heated and cooled in lamination with the master tape. When the compressed air is discharged not directly but through the porous sintered alloy as in this embodiment, the flow discharged air is equalized and the compressed air can be smoothly discharged also from the shoulder portion of the compressing unit where the slave tape is bent. Therefore, it is unnecessary to provide auxiliary discharge nozzles as shown in FIGS. 13 – 15.

2. Embodiment applying the arrangement of FIG. 12

With reference to FIG. 17, numeral 37 designates a cylinder made of a heat-resistant glass such as quartz glass, or other heat-resistant material, and a heater consisting of a gas burner 40, 39 is provided in said cylinder. The cylinder 37 is provided with a window 38, through which a nozzle 40 of the gas burner is inserted into said cylinder, and a fuel gas discharged from the nozzle 40 is burned to heat the glass wall of the cylinder by the combustion flame. By arranging the cylinder 37 and the gas burner such that a portion of the cylinder which is on the side facing the slave tape and closest to the point of contact of the master and slave tapes may be red-heated, it is possible to heat only the slave tape by the radiant heat emitting from the red-heated portion of the cylinder wall, at a point just before said point of contact. The burner 39 is disposed within the cylinder 37 and constantly maintains a small flame for the ignition of fuel gas discharged from the nozzle 40. The fuel gas is supplied to the nozzle 40 only at the time of transfer and the combustion gas is discharged to the outside from the top end of the cylinder 37. Although the heater used in the embodiment of FIG. 17 is cylindrical in shape, the shape of the cylinder may be optionally selected according to the construction of the apparatus in the vicinity of the point of contact of both tapes. In the embodiment of FIG. 16, the heater made of a heat-resistant glass is constructed in the shape as indicated at 37′ and disposed along the path of travel of the slave tape. The heater 37′ is partially red-heated by a gas burner 40 and the slave tape is heated by the radiant heat emitting from the red-heated portion of said heater.

The heater shown in FIG. 18 is a further modification of that shown in FIG. 16. As shown, parallel slots are formed in the portion of the heat-resistant glass heater 37′ facing the slave tape and the heater is red-heated by the gas burner 40. The slave tape is heated by both the radiant heat from the heater and the hot gas ejecting through the slots.

The distance between the slots may be varied as shown in FIG. 18 so as to obtain optimum heated conditions of the slave tape. In case of the heater shown in FIG. 18, the distance is progressively reduced toward the point of contact of both tapes so that the slave tape may be slowly heated to the highest temperature at a point just before said point of contact. This heating method has the following advantages:

1. The heat can be concentrated to a portion near the surface of the slave tape and the other portions of the apparatus which it is not desired to heat are not heated.
2. The heat-resistant glass is not subjected to characteristic degradation or property change by heating and, therefore, can be used stably for a long period of time and semi-permanently.
3. The heating temperature can be freely controlled by adjusting the flow rate of fuel gas and the heating conditions can also be freely changed by using a heater of the type shown in FIG. 18.
4. When quartz glass or the like is used as the heat-resistant material, the shape of the heater can be freely changed according to the construction of the apparatus in the vicinity of the point of contact of both tapes, and in addition, the distance between the heater and the adjacent apparatus can be freely selected.
5. The aqueous vapor or other compounds resulting from the combustion of fuel gas impose substantially no adverse affect on the magnetic tapes, as they are discharged to the outside of apparatus from the top end of the heater.

Any of the constructions described above is designed for effecting the transfer while keeping the slave tape out of contact with the heater during its travel. However, the transfer can also be effectively achieved by travelling the slave tape with its magnetic surface in direct contact with the heater. A practical construction for such a mode of transfer can be obtained by bringing the slave tape 17 into contact with the heater 37 in FIG. 17 (or similarly bringing the slave tape 2 into contact with the heater 37 in FIG. 16). Such a method has the advantage that, since there is no heat transfer medium of a small thermal conductivity, such as air, existing between the heater and the slave tape, the heat loss otherwise occurring due to the presence of such medium can be avoided and accordingly the heat transfer rate can be remarkably increased and the concentration of thermal energy to the magnetic layer of the slave tape in a short period of time is further facilitated.

Although the direct contact method described above is advantageous in respect of effective transfer of thermal energy, it has on the other hand some problems which are brought about by direct contact. One of them is that, by reason of the fact that heat is transferred by direct contact, the transfer of heat is largely affected by the state of contact, and a full consideration must be given to the distortion or surface characteristics of the contacting portion of a heat transfer member 14, as well as to the non-uniformity of tension distribution in the slave tape (in the widthwise direction of the tape). These problems can be obviated by employing the method described previously in which the slave tape is kept out of contact with the heater and the thermal energy from the heater is supplied to the tape by way of radiation.

In the process according to the present invention, a sufficient consideration is also given to the problems involved in the direct contact method. Namely, the heat transfer member 37 (the cylinder 37) is provided with a through-hole. In general, when the direct contact method is employed in the thermal copying of a master tape, the occurrence of a certain degree of transfer uneveness in the copies tapes is inevitable due to the influence of the distortion and surface characteristics the portion of the heat transfer member 37 where said member is contacted by the slave tape, and the non-uniformity of tension distribution in the slave tape, stated above. Such transfer unevenness is particularly apparent in case of a video tape. When the through-hole is provided in the heat transfer member 37, the magnetic surface of the slave tape is out of contact with the member 37 at the through-hole and therefore, the problems caused by direct contact do not occur during passage of the tape over the through-hole. By providing the through-hole, it is possible to directly and uniformly heat the magnetic surface of the slave tape by the flame from the gas burner through said through-hole. The effect of the through-hole is greater as it is located closer to the point of transfer where the slave and master tapes are brought into contact with each other, and the substantial part of the heating unevenness having occurred in the slave tape before the slave tape reaches the through-hole is remedied to a uniformly heated state (especially, an ample amount of thermal energy is supplied to the insufficiently heated portions of the tape). In addition, the heat transfer rate is further improved at the through-hole, since the heat energy of the flame is directly transmitted to the magnetic surface of the slave tape through the through-hole, without indirectly through the wall of the heat transfer member 37. This means that the proportion of the thermal energy transmitted to the slave tape at the portion other than the through-hole, to that transmitted through said through-hole is decreased and that the restrictions imposed on the design of the heat transfer member 37 with respect to the thermal conductivity and shape (particularly the wall thickness) thereof are substantially alleviated. Consequently, the wall thickness of the heat transfer member can be increased and hence the resistance to heat of the heater can be increased.

Of course, the shape, number and location of the through-hole do not undergo any limitations and can be freely selected best to meet the requirement. With reference to the heating plate shown in FIG. 18, the heating plate having a single through-hole is advantageous over that having a plurality of through-holes in that the thermal deformation of the portions between adjacent through-holes occurring in case of the latter type of heating plate need not be taken into account. In this embodiment, the through-holes each have a slit-like shape and such a shape is one of the shapes most effective for decreasing the heating unevenness of the slave tape in the widthwise directions thereof.

3. Constructions of the gas nozzle

FIGS. 21 – 25 exemplify the practical constructions of the gas nozzle, which will be described in comparison with the gas nozzle shown in FIGS. 19 and 20.

With reference to FIG. 19, numeral 41 designates a flame discharge nzzoel and 42 designates a heating plate which is directly heated by the flame from said nozzle 41. Numeral 2 designates a slave tape travelling with its magnetic surface in direct contact with the heating plate 42 to be heated thereby. The magnetic surface of the slave tape is brought into contact with the magnetic surface of the master tape immediately after it has been heated, and then said slave and master tape are cooled in lamination, whereby the signal recorded on the master tape is transferred onto the slave tape. FIG. 20 is a sectional view of a conventionally used flame discharge nozzle. The ordinary flame discharge nozzle heats the heating plate in a substantially circular shape. Therefore, the temperature distribution of the heated portion is not uniform, namely the temperature becomes lower radially outwardly from the center of flame, and it is impossible to uniformly heat the slave tape having a constant width. Uniform heating may be achieved by making the flame large and thereby increasing the diameter of the heated portion of the heating plate, but such a method is accompanied by a large heat loss and a substantial degradation of heating efficiency. Moreover, the combustion state is adversely affected by the excess flame and the handling of the flame becomes difficult. Besides, the component parts generally become large in size, imposing additional restrictions to the freedom of design. FIGS. 21 – 25 show various forms of the flame nozzle element according to the invention, in which numeral 44 designates gas discharge nozzles. The diameter and number of the gas discharge nozzles 44 are not fixed and can be freely selected so as to be optimum for the particular tape width, distance from the heating plate, gas pressure, etc. In the form shown in FIG. 21, the flame nozzle element has gas discharge nozzles arranged in three rows in each of the travelling direction and width-wise direction of the tape. FIG. 22 is a view showing the flame nozzle element of FIG. 21 being used for heating the slave tape, and numeral 43 designates the nozzle element and 45 designates flames discharged from said nozzle element. Numeral 46 designates a slave tape heating plate to be directly heated by the flames. The heating plate is made of a material having a high heat-resistance and high conductivity, and has a good surface condition and a smallest possible thickness. Numeral 2 designates a slave tape travelling in direct contact with the heating plate. Immediately after the magnetic surface is heated, the slave tape is put together with a master tape with their magnetic surfaces in contact with each other, and then cooled in that state, whereby the signal on the master tape is transferred onto the slave tape. When this nozzle element is used, the shape of the entire flame can be freely changed and, by effectively arringing the nozzles, it is possible to heat substantially uniformly the entire area of the portion to be heated of the heating plate.

Figure 23:
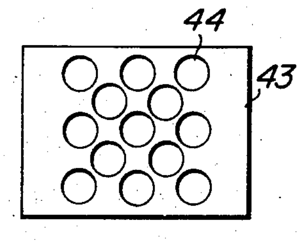
Figure 25A:
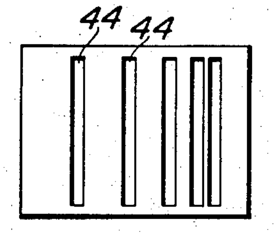
Figure 24:
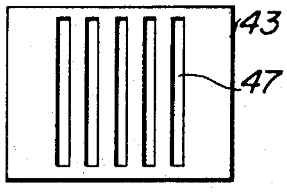
Figure 25B:
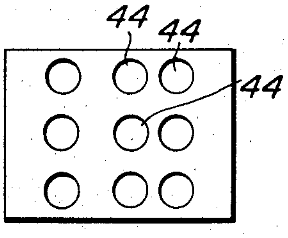

Since small flames can be formed at a uniform and high density, the heat loss is small and the heating efficiency is high. Particularly because the length of the flames can be shortened, the amount of heat which would otherwise be lost to the outside in the distance from the nozzles to the heating plate can be drastically decreased. In addition, the handling of flames is easy and the dimensions of the component parts can be generally decreased, facilitating the freedom of design. FIGS. 23 and 24 show other forms of the flame nozzle element. Both of FIG. 23 and 24 are front elevational views of the flame nozzle elements, and numeral 44 designates flame nozzles. The flame nozzle element shown in FIG. 23 has the nozzles arranged in zigzag. This nozzle element is capable of forming a uniform flame as a whole and can be easily fabricated. The flame nozzle element shown in FIG. 24 has a plurality of slit-shaped nozzles 47 arranged in the travelling direction of the slave tape and each having a length corresponding to the width of the tape. This nozzle element has essentially the same effect as that of the preceding nozzle element. Where it is necessary to control the heating temperature in the travelling direction of tape as by slightly preheating the slave tape from normal temperature, in the process of short-time heating, this may be achieved simply by varying the distance between the flame nozzles 44 (or the size of the flame nozzles) in the travelling direction of tape, as shown in FIGS. 25*a* and 25*b*, whereby the same effect as that of the nozzle element of FIG. 18 can be obtained.

4. Example 1. of the practical construction of the heating plate

FIGS. 26 and 27 show an example of the practical construction of the heater according to the present invention, which will be described hereunder in comparison with the heater shown in FIG. 12. In case of the heater shown in FIG. 12, which consists of the hollow slave tape heating member 13 including the casing 19 to enclose the flame, the necessary thickness of the heating member to limit the deformation of thermal stress under the predetermined value is determined by the internal distribution of constituent material and the intensity of material.

On the other hand, for obtaining a good copied tape with a minimum deformation by shortening the slave tape heating time, it is necessary to increase the thermal energy permeating a unit area of the heating plate. The amount of permeating thermal energy is proportional to the temperature gradient between the front and back sides of the heating plate and the temperature of the side of the slave tape in contact with the slave tape needs to be maintained substantially constant. Therefore, in order to shorten the heating time, it becomes necessary to elevate the temperature of the back side (the side contacted by the flame) of the heating plate, if the plate thickness is constant.

Thus, the temperature becomes extremely high at the side of the heating plate contacted by the flame, shortening the useful life of heating plate. The use of glass or ceramics for the heating plate to avoid oxidation by heating, because of their poor heat conductivity, is disadvantageous in that the capacity of the heat source must be increased. In addition, a large temperature difference occurs between the portion of the slave tape in contact with and the portion of the same not in contact with the heating plate, with the result that the edge portions of the tape become higher in temperature than the central portion and are subjected to deformation. These problems can be solved by the arrangement illustrated in FIGS. 26 and 27.

FIG. 26 is a sectional view of the arrangement looking in the thicknesswise direction of the heating plate, and numeral 48 designates a gas burner, 45 a flame, 46 a heating plate and 2 a slave tape travelling in contact with the heating plate. As shown, the heating plate 46 is constructed such that the portion to be contacted by the slave tape is smaller in thickness than the other portions. Here, it is essential that the width A of the reduced thickness portion is larger than the tape width B. The thickness of the reduced thickness portion is preferably as small as possible. In practice, however, it is subjected to a limitation from the viewpoint of mechanical strength even if the reduced thickness portion is reinforced to some extent by the opposite larger thickness portions, and is variable depending upon the material of the heating plate. It has been found through experiment that copper (or copper alloys), stainless steel, and titanium alloys are suitably used for this purpose. Reducing the thickness of the heating plate at the portion contacted by the slave tape brings about the advantages that the output of the gas burner can be decreased as the temperature difference between the side exposed to the flame and the side contacted by the slave tape can be made small, and that the oxidation problem can be alleviated and hence the useful life of the heating plate can be prolonged as the temperature of the heating plate at the side exposed to the flame becomes low. There is the additional advantage that, since the temperature difference between the portion of the heating plate contacted by and the portion of the same not contacted by the slave tape is small, an undesirable thermal deformation of the slave tape at the edge portions thereof can be avoided.

FIG. 27 exemplifies the thermal copying apparatus comprising the heater of the type described above. Numeral 3 designates a capstan, and a master tape 1 and a slave tape 2 laminated with their magnetic layers in contact with each other are pressed against the capstan under the effect of compressed gas discharged through a porous metal 33, to be driven thereby. Numeral 12 generally designates a tape compressing unit having a compressed gas inlet port and 49 generally designates a slave tape heater of the type shown in FIG. 26, which is reduced in thickness only at the portion 50 contacted by the slave tape. In the illustration, a gas burner is shown as a heat source but any other heat source such as a high output infrared ray heater may also be used.

5. Example 2. of the practical construction of the heating plate

Figure 30:
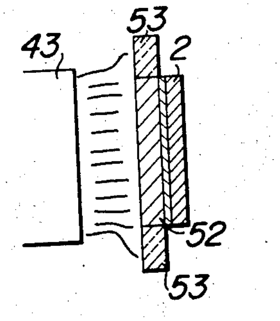
Figure 31:
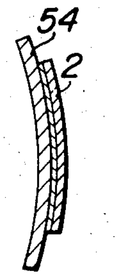
Figure 32:
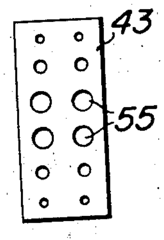
Figure 33:
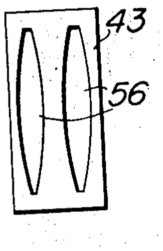

The heating plates shown in FIGS. 28 – 33 are modifications of the heating plate described in the preceding example, which are designed to have a higher heating efficiency. FIG. 28 shows the portion to be contacted by the slave tape of the heating plate already described. Numeral 43 designates a slave tape heating member having a plurality of gas discharge nozzles, 51 the heating plate and 2 the slave tape. The heating plate of the construction described in the preceding example (having the thickness reduced at the portion contacted by the tape) is effective in respect of alleviating overheating of the tape at the edge portions but not sufficiently effective. The heating plates of the constructions to be described hereunder are capable of positively avoiding the overheating of the tape edge portions. According to the construction shown in FIG. 29, a heating plate 51 is progressively reduced in thickness from the opposite edges toward the central portion which is contacted by the slave tape as shown. In this case, the edge portions of the slave tape are heated gently as the thickness of the corresponding portions of the heating plate 51 is large, but the amount of heat supplied to the tape edge portions is sufficient to heat said portion to the desired temperature because heat is supplied also from the portions of the heating plate not in contact with the slave tape. The central portion of the tape is heated quickly and sufficiently by the heat of combustion gas as the thickness of the corresponding portion of said heating plate is relatively small. Thus, the tape can be heated uniformly over the width thereof. According to the construction shown in FIG. 30, a heating plate has a constant thickness but the portion 52 of the heating plate contacted by the slave tape and the portion 53 of the same not contacted by the tape are made of materials of different heat conductivities respectively. In the case of FIG. 30, the portion 52 of the heating plate is made of a material having a good heat conductivity, such as metals, and the portion 53 of the same is made of a material having a poor heat conductivity, such as ceramics. With such a heating plate, the slave tape receives more heat from the metallic portion than from the ceramic portion and thus can be uniformly heated without having its edge portions overheated. According to still another construction shown in FIG. 31, a heating plate 54 is curved with the side to be contacted by the tape providing a convexed surface. In this case, the slave tape contacts the heating plate with a larger contact pressure at the central portion than at the edge portions thereof and accordingly, receives more heat at the central portion than at the edge portions from the heating plate, even though the thickness of said heating plate is uniform. This plus the fact that the edge portions of the tape also receive heat from the portion of the heating plate not in contact with the tape, makes it possible to uniformly heat the slave tape over the width thereof. In the constructions shown in FIGS. 32 and 33, the diameters 55 or the width 56 of heating gas discharge nozzles 43 are progressively reduced from the center toward the edges of heating plates, so that the amount of heat supplied to the tape may be largest at the central portion of said heating plates and progressively decreased toward the edge thereof. The heating plates of such constructions are also capable of heating the slave tape uniformly over the width thereof and can be effectively used in practical thermal copying apparatus for producing good copied tapes free of local variations such as widthwise bends.

6. Example 1. of the practical construction of the heating means

With reference to FIG. 34, numeral 12 designates a compressing unit comprising an air chamber 35 and a compressing portion 33 made of a porous material. A compressed gas, such as air, nitrogen, or carbon dioxide gas, is introduced into the air chamber 35 from a nozzle 34 and discharged through the pores in the porous compressing portion, to compress the slave and master tapes. Numeral 57 designates a heater provided immediately before the point of contact of both tapes.

A porous material 60 is connected to the forward end of the heater, and a compressed gas similar to that mentioned above is introduced into the outer peripheral portions 58, 59 of the heater and discharged through the pores in said porous material 60. In the heater 57 is disposed a gas burner 22 or the like to heat the porous material 60. The pores in the porous material 60 at the portions which are not contacted by the slave tape are closed as by grinding, so that the compressed gas may be discharged only from the portion in contact with the tape. FIG. 35 is a view of the heater looking in the direction toward the tape. As seen, a compressed gas inlet passage 59 is formed along the periphery of the heater 57 and the pores of the porous material at the hatched portion other than contacted by the slave tape 2 are clogged by grinding or applying a suitable material. It is to be understood that the compressed gas inlet passage may be provided at the central portion of the heater as required, instead of providing it only at the outer periphery of the porous material. When such a heater is used for heating the slave tape, the slave tape travels along a path closely spaced from the heater and is heated by the radiant heat from the heater and the hot compressed gas being discharged through the pores of the porous material. Since the slave tape is held out of contact with the heater during its travel, a deformation of the tape otherwise caused by the rugged surface of or friction with the heater, or non-uniform heating of the tape can be avoided, providing for satisfactory transfer. The compressing unit 122 is of such a construction that it is capable of pressing the master and slave tapes in lamination against the outer surface of a rotor and concurrently urging the slave tape toward the heater 57. According to such an arrangement, it is possible to position the heater in the very close proximity of the point of transfer and, in addition, a smooth travel of the slave tape in close relation with the heater can be obtained. When the compressing unit is used simultaneously for urging the slave tape toward the heater, the gap between the heater and slave tape can be decreased, so that the radiant heat from the porous material at the forward face of the heater can be effectively utilized and the heat of hot compressed air being discharged through the porous material can also be effectively used. By employing the heating method utilizing compressed gas, the deformation of the slave tape by heat can be minimized because the slave tape is kept out of contact with portions of the apparatus other than the portion required to be in contact therewith. As a method of heating the porous material of the heater, the gas burner is used in the arrangement of FIG. 34, but other methods may also be used as will be described hereunder: Namely, the porous material may be heated by the heat generated by a nichrome wire inserted into holes 62, formed in the porous material 61, through a suitable electric insulator as shown in FIG. 36 or may be heated by a high frequency heating. It is also to be understood that the thermal energy from the heater transmitted to the slave tape and the sliding resistance of the slave tape with the heater can be optionally controlled by controlling the pressure of compressed air discharged through the porous material and holding the slave tape and the surface of the heater in an intermediate condition of contact and out of contact.

7. Example 2 of the practical construction of the heating means

FIG. 37 is a perspective view briefly showing another form of the heater. A heater 63 is made of a material having a high heat conductivity into a hollow body and has a boat-like cross-sectional shape so that it may be placed as close as possible to the point of transfer P (FIG. 10).

The outer surface of the heater 63 is constantly uniformly maintained at a high temperature by a hot fluid circulating through the hollow body from the exterior.

According to this method, a heat source of a higher energy density (heat flux) than lamps and electric heaters can be obtained by suitably selecting the kind, flow velocity and temperature of the circulating fluid, and a sufficient amount of energy can be supplied to the slave tape even when it is desired to heat the slave tape in a short period of time.

Further, by suitably selecting the configuration of the heater 63, it is possible to concentrate the thermal energy to a point very close to the point of contact and transfer and hence to enhance the heating efficiency. In addition, the thermal energy radiating from the heater can be substantially entirely used for heating the slave tape, without adversely affecting the other elements nearby, and the handling of the heater is easy and the design of the apparatus can be facilitated.

8. Example 3 of the practical construction of the heating means

FIG. 38*a* is a plan view and FIG. 38*b* is a front elevational view, briefly showing still another form of the heating means. A heater 64 consists of a hollow rotor 164 and a heat generator 65 fixedly disposed in said hollow rotor. The rotor 164 is made of a material having a high heat conductivity, it may be made of a material having a small coefficient of linear expansion, such as quartz glass, where thermal deformation of tape should be taken into consideration. The heat generator may be a lamp, an electric heater or a heating element of silicon carbide.

The length of the rotor 164 is made much longer than the tape width, so that the thermal energy may be transferred to the tape also from the portion other than the portion in contact with the tape. The heater of this type has the advantage that, since the heat generator is fixed in the hollow rotor, only little amount of thermal energy is permitted to dissipate to the outside of tape and hence the heating efficiency is high. Furthermore, since the hollow rotor is rotating, the slave tape in contact therewith is successively heated by the peripheral surface of said rotor previously heated at a high temperature from the interior by the heat generator 65, and the surface temperature of the rotor can be constantly maintained at a high temperature. Still further, the rotation of the heater prevents slippage of the slave tape on said heater, ensuring smooth travel of the tape, high heat transfer rate and a less uneven heating.

9. Example of the construction of the compressing mechanism

With reference to FIG. 39, numeral 66 designates an air chamber, and compressed air is introduced externally into said air chamber and discharged against the base surface of a slave tape 2 through a nozzle member 67. The nozzle member 67 consists of a porous sintered metal and the compressed air pressure is discharged substantially uniformly around said nozzle member. Further, the nozzle member 67 is movable and urged toward the peripheral surface of a capstan 3 with a constant pressure during travel of the tape. A master tape 1 and the slave tape 2 are pressed in lamination, with their magnetic surface in tight contact with each other, against the peripheral surface of the capstan by the nozzle member and a frictional force occurs between the capstan and the master tape according to the contact pressure. The pressure of compressed air discharged from the nozzle member 67 is made slightly larger than the external force by which the nozzle member 67 is urged toward the capstan. Therefore, the nozzle member 67 is kept afloat, with the external force in balance with the compression air pressure, forming a slight gap between it and the base surface of the slave tape 2. Namely, the slave tape is held out of contact with the nozzle member 67 by an air layer formed in the slight gap and subjected to a frictional force which is of a substantially negligible size. In other words, while the slave tape 2 is pressed against the outer periphery of the capstan 3 in lamination with the master tape by the compressed air pressure discharged from the nozzle member and driven by said capstan, the frictional resistance created by the stationary nozzle member 67 is essentially none, allowing the slave tape to continue its smooth travel. The nozzle member 67 has an arcuate shape and the outer peripheral portion of the capstan 3 is made of an elastic material. Therefore, the outer peripheral portion of said capstan is elastically deformed into a complementary arcuate shape at the portion where it takes the compressed air pressure, and the master and slave tapes are held in tight contact with each other over a length corresponding to the length of said arcuately deformed portion of the capstan, as shown in FIG. 40. Numeral 6 designates a baffle plate which prevents the radiant heat from a heater 110 fromm reaching the magnetic surface of the master tape 1. By increasing the pressure of compressed air, the pressure can be applied concentrately to the slave tape and an improved state of contact between the master and slave tapes can be obtained. Furthermore, by previously cooling the compressed air, the slave tape, having been heated to a temperature near the Curie point, can be cooled concurrently with contact with the master tape, whereby the transfer can be achieved under better conditions and also a temperature rise of the air chamber 68 and nozzle member 67 can be avoided.

In case of the apparatus constructed as shown in FIG. 16, it is necessary that the nozzle member and capstan are aligned with precision as they are made of rigid materials. According to this embodiment, however, such problem of precision can be drastically alleviaged. In addition, owing to the fact that the outer peripheral portion of the capstan is made of an elastic material, the shape of the nozzle member 67 can be freely selected. FIG. 41 shows a modification of the compressing mechanism described above, in which the nozzle member consists of a sintered material having a plate-like shape. The use of such a nozzle member is advantageous in that the elastic deformation of the outer peripheral portion of the capstan can be decreased and a smoother travel of tape can be obtained.

10. Example 4 of the practical construction of the heating means

In this example, as shown in FIG. 42, an air chamber 69 is pivotable about a point P through an arm 70 and urged against the outer periphery of the capstan 3, with the master tape 1 and slave 2 intervening therebetween, under the biasing force of a spring 71. The front end portion 72 of the air chamber consists of a porous sintered metal. Compressed air supplied externally into the air chamber from an inlet port 73 is discharged from the entire area of the surface of the front end portion 72. Therefore, it will be appreciated that an air layer is formed between the surface of the end portion 72 and the base surface of the master tape 1, keeping said master tape out of contact with said end portion 72. Therefore, the master tape can be laminated with the slave tape, without undergoing any substantial frictional resistance in the direction of travel, and both tapes are pressed against the outer periphery of the capstan 3. On the other hand, a slave tape heating chamber 74 has a similar construction and is urged toward the outer periphery of the capstan 3, with the slave tape 2 intervening therebetween, under the biasing force of a spring 75. It is also similar to the air chamber 69 that compressed air is introduced into the heating chamber 74 from an inlet port 76 and discharged from the surface of a porous sintered alloy 77. By balancing the compressed air pressure and biasing force of the spring 75, a thin air layer is formed between the magnetic surface of the slave tape 2 and the surface of the porous sintered alloy 77, whereby the frinctional resistance to the slave tape is decreased to such an extent as will not interfere with the travel of slave tape. The compressed air supplied from the inlet port 76 is previously heated at least to a temperature above the Curie point of the tape, as contrasted to the compressed air supplied to the air chamber 69 which is previously cooled, and the compressed air discharged from the porous sintered alloy 77 is naturally high in temperature. Accordingly, the sintered alloy 77, similar to the compressed air, has a temperature at least higher than the Curie point of the slave tape. The magnetic layer of the slave tape is heated to a temperature near the Curie point thereof by the heat of compressed air and sintered alloy 77 and then pressed against the capstan 3. Since the frictional resistance to the slave tape is substantially decreased owing to the use of compressed air, it does not interfere with the smooth travel of slave tape. The air chambers 69 and 77 are arranged as close to each other as allowable designwise, so that the slave tape 2, after having been heated to a temperature near the Curie point by the sintered alloy 77, is immediately laminated with the master tape, with their magnetic surfaces in face-to-face contact, which master tape is supplied along a different path curved along the shoulder of the end portion 72 of the air chamber 69, and pressed against the outer periphery of the capstan 3 in lamination with said master tape, and concurrently cooled by the compressed air pressure discharged from said air chamber. Thus, the signal on the master tape is transferred onto the slave tape.

The practical construction of the heating chamber 74 will be described with reference to FIGS. 43 and 44. As seen in FIG. 43, the porous sintered alloy 77 is hermetically connected to compressed air supply passages 78 at the opposite ends of the back side thereof, and hot air supplied from said passages is discharged through the pores in said sintered alloy. The pores on the portion of the back side surface other than the portions connected to the passags 78 of the sintered metal are clogged by suitable means so that air may not be discharged from said portion, and a gas burner 79 is provided in the heating chamber to direct a flame 80 toward the clogged portion. Thus, the sintered alloy 77 is heated to a high temperature and at the same time, heated compressed air is discharged from the entire area of the surface of said sintered alloy. FIGS. **44*a* and 44*b* show modifications of the forward end portion of the heating chamber 74. In FIG. 44*a*, numeral 81 designates a member having compressed air discharge nozzles each consisting of a sintered alloy, which is normally made of a metal. The member 81 is connected to compressed air passages 82 on the back side thereof and hot compressed air C supplied externally through said passages is discharged from the front side 83 of said member. The entire portion including the member 81 and the walls of the passages 82 is heated by the flame to achieve the intended object. In FIG. 44*b*, a sintered alloy is not used for nozzles but compressed air discharge holes 85 are formed in an ordinary metal piece 84 and air supply passages 86 are connected each to each of said discharge holes. Hot compressed air C is supplied externally through the passages 86 and discharged from the respective discharge holes 85. The entire portion including the metal piece 84 and the passages 86 is heated by a flame D. As mentioned above, either a porous material or a conventional member having compressed air discharge holes may be used at the forward end portion of the heating chamber 74,** or both of them may be used. The former has the advantage that uniform discharge of air can be obtained and the latter has the advantage that it provides improvements in respects of both heat resistance and heat conductivity. These advantages can be more effectively utilized when both of the members are used in combination.

According to the present invention, the following advantages can be obtained:

1. The frictional resistance between the slave tape and the heater can be freely adjusted and the squealing of tape can be eliminated even when the temperature rises. Therefore, a stable travel of tape can be obtained.
2. The contact pressure between the magnetic surface of tape and the heater can be maintained at the optimum value by adjusting the heater depressing force, without particularly increasing the slave tape feed tension, and a deformation of the slave tape by the feed tension can be minimized.
3. Since the slave tape is lapped around the outer periphery of the capstan before it reaches the heating portion and is pressed against said capstan by the heater at said heating portion, the detrimental effects of vibrations, etc. on the running tape can be minimized.

What is claimed is:

1. A magnetic tape copying apparatus for transferring a magnetic signal recorded on a master tape onto a slave tape, comprising: a cylindrical rotary body;

means for separately supplying master and slave tapes to said rotary body, said tapes being trained at least partially around the outer surface of said rotary body such that their respective magnetic surfaces are in facing relationship with each other;

means for discharging a fluid under pressure against the portion of said tapes trained around said rotary body to press one of said tapes against the other, said fluid discharge means including a discharge member having fluid inlet and fluid outlet end portions, said discharge member further having a first curved portion forming at least a part of the outlet end portion of said discharge member and located adjacent to and spaced from said rotary body, said rotary body and said first curved surface defining a gap through which said tapes pass, and a second curved surface, the center of curvature of which is located opposite the center of curvature of said rotary body with respect to the path of travel of said tapes, one of said tapes being trained to pass adjacent to said second curved surface upstream of said gap with respect to the direction of travel of at least one of said tapes;

heating means located upstream of said second curved surface with respect to said direction of travel for heating said slave tape;

fluid supply means coupled to said fluid inlet portion of said discharge member for supplying fluid under pressure to said discharge member, wherein said pressurized fluid is discharged through said outlet portion, one portion of said discharged fluid urging said tapes in said gap into contact with each other against the outer surface of said rotary body to transfer magnetic signal information from said master tape onto the heated slave tape, and a second portion of said discharged fluid urging said one tape out of contact with said second curved surface; and take-up means located on the opposite side of said gap from said supply means for separately taking up said master and slave tapes after said information has been transferred onto said slave tape from said master tape.

2. A magnetic tape copying apparatus as defined in claim 1, wherein the fluid discharged from the discharge member for pressing the master and slave tapes against the outer peripheral surface of the rotary body is partially used for pressing the magnetic surface of said slave tape against said heating means.

3. A magnetic tape copying apparatus as defined in claim 1, wherein said discharge member is provided with an outlet in the second curved surface.

4. A magnetic tape copying apparatus as defined in claim 1, wherein said slave tape heating means is disposed in the proximity of the point of transfer and comprises a heating plate in the shape of a hollow casing and a burner disposed in said casing, the flame from said burner being blown against the inner wall of said heating plate, whereby the thermal energy is transmitted to the outer wall of said heating plate to heat the slave tape travelling in contact with said outer wall.

5. A magnetic tape copying apparatus as defined in claim 4, wherein said slave tape heating means is provided with a plurality of flame discharge openings so that the flame may be in a shape approximating the shape of the portion to be heated of the slave tape.

6. A magnetic tape copying apparatus as defined in claim 4, wherein the portion of said slave tape heating plate to be contacted by the slave tape or flame discharge openings formed therein is or are varied in shape from the portion corresponding to the central portion toward the portions corresponding to the edge portions of the slave tape, so that the slave tape may be heated uniformly over the width thereof.

7. A magnetic tape copying apparatus as defined in claim 1, wherein said slave tape heating means comprises a heat conductive member made of a heatresistant material, and disposed along the path of travel of the slave tape in the proximity of the point of contact of the master and slave tapes, and a combustor, such as a burner, for heating the portion of said heat conductive member facing the slave tape from the inside thereof, whereby the slave tape is heated by the heat ray radiating from the heated heat-resistant material.

8. A magnetic tape copying apparatus as defined in claim 1, wherein said slave tape heating means comprises a heat conductive member made of a heat-resistant material having at least one opening on the side thereof, facing to said slave tape, said heat conductive member being disposed along the path of travel of the slave tape in the proximity of the point of contact of the master and slave tapes, and a combustor, such as a burner, for heating only the portion of said cylindrical or substantially U-shaped body facing the slave tape from the inside thereof, whereby the slave tape is heated by the heat ray radiating from the heated heat-resistant material.

9. A magnetic tape copying apparatus as defined in claim 1, wherein said slave tape heating means comprises a heating plate so constructed that the thickness thereof is smaller at the portion to be contacted by the magnetic layer of the slave tape than at the other portions.

10. A magnetic tape copying apparatus as defined in claim 1, wherein said slave tape heating means comprises a heating plate at least a portion of which is made of a porous material, means for heating said porous material and means for discharging a gas from the pores of said porous material.

11. A magnetic tape copying apparatus as defined in claim 1, wherein said slave tape heating means comprises a heating plate in the shape of a hollow body disposed in the proximity of the point of transfer and means for circulating through said heating plate a fluid heated at least at a temperature above the Curie point of the slave tape to heat said heating plate and thereby to heat the slave tape travelling in contact with the outer wall of said heating plate.

12. A magnetic tape copying apparatus as defined in claim 1, wherein said slave tape heating means comprises a rotatable cylinder disposed in the proximity of the point of transfer and a heat generating element disposed within said cylinder to heat said cylinder and thereby to heat the slave tape travelling with its magnetic layer in contact with said cylinder.

13. A magnetic tape copying apparatus as defined in claim 1, wherein a slave tape heating means providing a proper form and heated by another thermal source is disposed along the path of travel of the slave tape, and the slave tape is heated by said slave tape heating means.

14. A magnetic tape copying apparatus as defined in claim 1, wherein flame is used as a thermal source, and a plurality of flame discharge nozzles is disposed at a flame nozzle element.

15. A magnetic tape copying apparatus as defined in claim 1, wherein said first and second curved surfaces are made of porous sintered metal in one body.

16. A magnetic tape copying apparatus as defined in claim 1, wherein said discharge member outlet portion is positioned at the end portion at the tape leading side of said first curved surface.

17. A magnetic tape copying apparatus as defined in claim 1, wherein said discharge member includes a first porous member having said first curved surface and forming said outlet end portion; and wherein said heating means comprises a member having a fluid inlet portion and a fluid outlet portion, the latter including a second porous member having a curved surface of a radius of curvature corresponding to said first curved surface, the curved surface of said second porous member defining with said rotary body a second gap through which said slave tape is passed, said fluid supply means supplying fluid under pressure to said fluid inlet portion of said heating means member, said heating means heating the pressurized fluid supplied thereto prior to the discharge of said fluid through said second porous member.

18. A magnetic tape copying apparatus for transferring a magnetic signal recorded on a master tape onto a slave tape, comprising:

a rotary body having an outer surface formed of elastic material;

pressing means located adjacent the elastic outer periphery of said rotary body, said pressing means including a porous centered member and means for discharging fluid under pressure through said porous member against the elastic outer periphery of said rotary body;

means for separately supplying master and slave tapes from respective supply reels to at least one reel through predetermined paths such that one of said tapes is trained at least partially around the outer periphery of said rotary body and the other of said tapes is trained at least partially around the surface of said pressing means and such that the magnetic surfaces of said tapes are in facing relationship with each other;

heating means located upstream of said rotary body with respect to the direction of travel of said tapes between said supply and take-up reels for heating said slave tape; and fluid supply means coupled to said discharge means for supplying fluid under pressure to said porous member, wherein said pressurized fluid is discharged through said porous member to urge said tapes into contact with each other against the elastic outer periphery of said rotary body to transfer magnetic signal information from said master tape onto the heated slave tape, said fluid urging said tapes away from and out of contact with said pressing means.

* * * * *